(12) United States Patent
Joshi et al.

(10) Patent No.: US 8,949,850 B2
(45) Date of Patent: *Feb. 3, 2015

(54) STATISTICAL TRACKING FOR GLOBAL SERVER LOAD BALANCING

(75) Inventors: Prajakta Suresh Joshi, Santa Clara, CA (US); Sunanda Lakshmi Kommula, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1791 days.

This patent is subject to a terminal disclaimer.

(21) Appl. No.: 11/429,177

(22) Filed: May 5, 2006

(65) Prior Publication Data

US 2010/0223621 A1 Sep. 2, 2010

Related U.S. Application Data

(63) Continuation of application No. 10/211,822, filed on Aug. 1, 2002, now Pat. No. 7,086,061.

(51) Int. Cl.
*G06F 9/46* (2006.01)
*G06F 15/173* (2006.01)
(Continued)

(52) U.S. Cl.
CPC .... *H04L 29/12066* (2013.01); *H04L 29/12783* (2013.01); *H04L 61/1511* (2013.01);
(Continued)

(58) Field of Classification Search
USPC .......................................................... 718/105
See application file for complete search history.

(56) References Cited

U.S. PATENT DOCUMENTS

| | | | |
|---|---|---|---|
| 5,031,094 A | 7/1991 | Toegel et al. | 364/200 |
| 5,359,593 A | 10/1994 | Derby et al. | 370/17 |

(Continued)

FOREIGN PATENT DOCUMENTS

| | | |
|---|---|---|
| EP | 1128613 | 8/2001 |
| WO | 01/39003 | 5/2001 |
| WO | 01/93530 | 12/2001 |

OTHER PUBLICATIONS

Cisco Document, "Configuring the CSS Domain Name Service,", posted on Dec. 2000, Cisco Systems Inc., http://www.ciscosystems.com, pp. 1-13.

(Continued)

*Primary Examiner* — Abullah Al Kawsar
(74) *Attorney, Agent, or Firm* — Novak Druce Connolly Bove + Quigg LLP

(57) ABSTRACT

Server load-balancing operation-related data, such as data associated with a system configured for global server load balancing (GSLB) that orders IP addresses into a list based on a set of performance metrics, is tracked. Such operation-related data includes inbound source IP addresses (e.g., the address of the originator of a DNS request), the requested host and zone, identification of the selected "best" IP addresses resulting from application of a GSLB algorithm and the selection metric used to decide on an IP address as the "best" one. Furthermore, the data includes a count of the selected "best" IP addresses selected via application of the GSLB algorithm, and for each of these IP addresses, the list of deciding performance metrics, along with a count of the number of times each of these metrics in the list was used as a deciding factor in selection of this IP address as the best one. This tracking feature allows better understanding of GSLB policy decisions (such as those associated with performance, maintenance, and troubleshooting) and intelligent deployment of large-scale resilient GSLB networks.

20 Claims, 3 Drawing Sheets

(51) Int. Cl.
*H04L 29/12* (2006.01)
*H04L 29/08* (2006.01)

(52) U.S. Cl.
CPC ............ *H04L61/35* (2013.01); *H04L 67/1008* (2013.01); *H04L 67/101* (2013.01); *H04L 67/1021* (2013.01); *H04L 67/1002* (2013.01); *H04L 67/1017* (2013.01); *H04L 67/1023* (2013.01)
USPC ........... 718/105; 718/104; 709/223; 709/224; 709/225; 709/226

(56) References Cited

U.S. PATENT DOCUMENTS

| | | | |
|---|---|---|---|
| 5,530,872 A | 6/1996 | Smeltzer et al. | |
| 5,867,706 A | 2/1999 | Martin et al. | |
| 5,918,017 A | 6/1999 | Attanasio et al. | |
| 5,948,061 A | 9/1999 | Merriman et al. | 709/219 |
| 5,951,634 A | 9/1999 | Sitbon et al. | 709/105 |
| 6,006,269 A | 12/1999 | Phaal | |
| 6,006,333 A | 12/1999 | Nielsen | |
| 6,012,088 A | 1/2000 | Li et al. | |
| 6,078,956 A | 6/2000 | Bryant et al. | |
| 6,092,178 A | 7/2000 | Jindal et al. | 712/27 |
| 6,112,239 A | 8/2000 | Kenner et al. | 709/224 |
| 6,115,752 A | 9/2000 | Chauhan | 709/241 |
| 6,119,143 A | 9/2000 | Dias et al. | |
| 6,128,279 A | 10/2000 | O'Neil et al. | 370/229 |
| 6,128,642 A | 10/2000 | Doraswamy et al. | 709/201 |
| 6,134,588 A | 10/2000 | Guenthner et al. | |
| 6,148,410 A | 11/2000 | Baskey et al. | |
| 6,157,649 A | 12/2000 | Peirce et al. | |
| 6,167,445 A | 12/2000 | Gai et al. | |
| 6,167,446 A | 12/2000 | Lister et al. | 709/223 |
| 6,178,160 B1 | 1/2001 | Bolton et al. | |
| 6,182,139 B1 | 1/2001 | Brendel | |
| 6,185,619 B1 | 2/2001 | Joffe et al. | |
| 6,195,691 B1 | 2/2001 | Brown | |
| 6,205,477 B1 * | 3/2001 | Johnson et al. | 709/220 |
| 6,233,604 B1 | 5/2001 | Van Horne et al. | 709/203 |
| 6,249,801 B1 | 6/2001 | Zisapel et al. | |
| 6,256,671 B1 | 7/2001 | Strentzsch et al. | |
| 6,260,070 B1 | 7/2001 | Shah | |
| 6,262,976 B1 | 7/2001 | McNamara | |
| 6,286,039 B1 | 9/2001 | Van Horne et al. | 709/221 |
| 6,286,047 B1 | 9/2001 | Ramanathan et al. | 709/224 |
| 6,304,913 B1 * | 10/2001 | Rune | 709/241 |
| 6,317,775 B1 | 11/2001 | Coile et al. | |
| 6,324,177 B1 | 11/2001 | Howes et al. | |
| 6,324,580 B1 | 11/2001 | Jindal et al. | 709/228 |
| 6,327,622 B1 | 12/2001 | Jindal et al. | |
| 6,330,605 B1 | 12/2001 | Christensen et al. | |
| 6,336,137 B1 | 1/2002 | Lee et al. | |
| 6,378,068 B1 | 4/2002 | Foster et al. | |
| 6,381,627 B1 | 4/2002 | Kwan et al. | 709/201 |
| 6,389,462 B1 | 5/2002 | Cohen et al. | 709/218 |
| 6,393,473 B1 | 5/2002 | Chu | |
| 6,405,252 B1 | 6/2002 | Gupta et al. | |
| 6,411,998 B1 | 6/2002 | Byant et al. | |
| 6,427,170 B1 | 7/2002 | Sitaraman et al. | 709/226 |
| 6,434,118 B1 | 8/2002 | Kirschenbaum | |
| 6,438,652 B1 | 8/2002 | Jordan et al. | 711/120 |
| 6,446,121 B1 | 9/2002 | Shah et al. | |
| 6,449,657 B2 | 9/2002 | Stanbach, Jr. et al. | 709/245 |
| 6,470,389 B1 | 10/2002 | Chung et al. | 709/227 |
| 6,473,802 B2 | 10/2002 | Masters | |
| 6,480,508 B1 | 11/2002 | Mwikalo et al. | 370/475 |
| 6,487,555 B1 | 11/2002 | Bharat et al. | |
| 6,490,624 B1 | 12/2002 | Sampson et al. | |
| 6,513,061 B1 | 1/2003 | Ebata et al. | |
| 6,542,964 B1 | 4/2003 | Scharber | |
| 6,549,944 B1 | 4/2003 | Weinberg et al. | 709/224 |
| 6,578,066 B1 | 6/2003 | Logan et al. | 709/105 |
| 6,578,077 B1 | 6/2003 | Rakoshitz et al. | |
| 6,601,084 B1 | 7/2003 | Bhaskaran et al. | |
| 6,606,643 B1 | 8/2003 | Emens et al. | 709/203 |
| 6,611,861 B1 | 8/2003 | Schairer et al. | |
| 6,647,009 B1 | 11/2003 | Kubota et al. | |
| 6,665,702 B1 | 12/2003 | Zisapel et al. | |
| 6,681,232 B1 | 1/2004 | Sistanizadeh et al. | 707/104.1 |
| 6,681,323 B1 | 1/2004 | Fontanesi et al. | 713/1 |
| 6,684,250 B2 | 1/2004 | Anderson et al. | |
| 6,691,165 B1 | 2/2004 | Bruck et al. | |
| 6,701,368 B1 | 3/2004 | Chennapragada et al. | |
| 6,725,253 B1 | 4/2004 | Okano et al. | |
| 6,745,241 B1 | 6/2004 | French et al. | |
| 6,748,416 B2 | 6/2004 | Carpenter et al. | |
| 6,754,699 B2 | 6/2004 | Swildens et al. | |
| 6,760,775 B1 | 7/2004 | Anerousis | |
| 6,772,211 B2 | 8/2004 | Lu et al. | |
| 6,775,230 B1 | 8/2004 | Watanabe et al. | |
| 6,779,017 B1 | 8/2004 | Lamberton et al. | |
| 6,785,704 B1 | 8/2004 | McCanne | |
| 6,789,125 B1 | 9/2004 | Aviani et al. | 709/238 |
| 6,795,434 B1 | 9/2004 | Kumar et al. | |
| 6,795,858 B1 * | 9/2004 | Jain et al. | 709/226 |
| 6,795,860 B1 | 9/2004 | Shah | |
| 6,801,949 B1 | 10/2004 | Bruck et al. | |
| 6,810,411 B1 | 10/2004 | Coughlin et al. | |
| 6,826,198 B2 | 11/2004 | Turina et al. | |
| 6,839,700 B2 | 1/2005 | Doyle et al. | |
| 6,850,984 B1 | 2/2005 | Kalkunte et al. | |
| 6,862,627 B1 | 3/2005 | Cheshire | |
| 6,874,152 B2 | 3/2005 | Vermeire et al. | |
| 6,879,995 B1 | 4/2005 | Chinta et al. | |
| 6,880,000 B1 | 4/2005 | Tominaga et al. | |
| 6,883,028 B1 * | 4/2005 | Johnson et al. | 709/226 |
| 6,898,633 B1 | 5/2005 | Lyndersay et al. | 709/226 |
| 6,901,081 B1 | 5/2005 | Ludwig | |
| 6,920,498 B1 | 7/2005 | Gourlay et al. | |
| 6,928,485 B1 | 8/2005 | Krishnamurthy et al. | |
| 6,950,848 B1 | 9/2005 | Yousefi'zadeh | |
| 6,963,914 B1 | 11/2005 | Breibart et al. | 709/226 |
| 6,963,917 B1 | 11/2005 | Callis et al. | 709/227 |
| 6,985,956 B2 | 1/2006 | Luke et al. | |
| 6,987,763 B2 | 1/2006 | Rochberger et al. | 370/389 |
| 6,996,551 B2 | 2/2006 | Hellerstein et al. | |
| 6,996,615 B2 | 2/2006 | McGuire | |
| 6,996,616 B1 | 2/2006 | Leighton et al. | |
| 7,000,007 B1 | 2/2006 | Valenti | 709/219 |
| 7,020,698 B2 | 3/2006 | Andrews et al. | 709/223 |
| 7,020,714 B2 | 3/2006 | Kalyanaraman et al. | |
| 7,028,083 B2 | 4/2006 | Levine et al. | |
| 7,032,010 B1 | 4/2006 | Swildens et al. | 709/219 |
| 7,032,031 B2 | 4/2006 | Jungck et al. | |
| 7,036,039 B2 | 4/2006 | Holland | |
| 7,047,300 B1 | 5/2006 | Oehrke et al. | |
| 7,058,706 B1 | 6/2006 | Iyer et al. | |
| 7,058,717 B2 | 6/2006 | Chao et al. | |
| 7,062,562 B1 * | 6/2006 | Baker et al. | 709/227 |
| 7,062,642 B1 | 6/2006 | Langrind et al. | |
| 7,080,138 B1 * | 7/2006 | Baker et al. | 709/224 |
| 7,082,102 B1 | 7/2006 | Wright | |
| 7,086,061 B1 | 8/2006 | Joshi et al. | 718/105 |
| 7,089,293 B2 | 8/2006 | Grosner et al. | |
| 7,099,915 B1 | 8/2006 | Tenereillo et al. | |
| 7,114,008 B2 | 9/2006 | Jungck et al. | |
| 7,117,269 B2 | 10/2006 | Lu et al. | |
| 7,117,530 B1 | 10/2006 | Lin | |
| 7,124,188 B2 | 10/2006 | Mangipudi et al. | |
| 7,127,713 B2 | 10/2006 | Davis et al. | |
| 7,136,932 B1 | 11/2006 | Schneider | |
| 7,139,242 B2 | 11/2006 | Bays | |
| 7,177,933 B2 | 2/2007 | Foth | |
| 7,185,052 B2 | 2/2007 | Day | |
| 7,194,553 B2 | 3/2007 | Lucco et al. | |
| 7,197,547 B1 | 3/2007 | Miller et al. | |
| 7,206,806 B2 | 4/2007 | Pineau | |
| 7,213,068 B1 | 5/2007 | Kohli et al. | |
| 7,225,236 B1 | 5/2007 | Puthiyandyil et al. | |
| 7,225,272 B2 | 5/2007 | Kelley et al. | |
| 7,240,015 B1 | 7/2007 | Karmouch et al. | |
| 7,240,100 B1 | 7/2007 | Wein et al. | |

(56) References Cited

U.S. PATENT DOCUMENTS

| | | | |
|---|---|---|---|
| 7,254,626 B1 | 8/2007 | Kommula et al. | |
| 7,257,642 B1 | 8/2007 | Bridger et al. | |
| 7,260,645 B2 | 8/2007 | Bays | |
| 7,277,954 B1 | 10/2007 | Stewart et al. | |
| 7,289,519 B1 | 10/2007 | Liskov | |
| 7,296,088 B1 | 11/2007 | Padmanabhan et al. | |
| 7,321,926 B1 | 1/2008 | Zhang et al. | |
| 7,330,908 B2 | 2/2008 | Jungck | |
| 7,383,288 B2 | 6/2008 | Miloushev et al. | |
| 7,423,977 B1 | 9/2008 | Joshi et al. | |
| 7,441,045 B2* | 10/2008 | Skene et al. | 709/241 |
| 7,454,500 B1 | 11/2008 | Hsu et al. | |
| 7,478,148 B2 | 1/2009 | Neerdaels | |
| 7,496,651 B1 | 2/2009 | Joshi | |
| 7,523,181 B2* | 4/2009 | Swildens et al. | 709/223 |
| 7,573,886 B1 | 8/2009 | Ono | |
| 7,574,508 B1 | 8/2009 | Kommula | |
| 7,581,006 B1 | 8/2009 | Lara et al. | |
| 7,581,009 B1 | 8/2009 | Hsu et al. | |
| 7,584,262 B1 | 9/2009 | Wang et al. | |
| 7,584,301 B1 | 9/2009 | Joshi | |
| 7,653,700 B1 | 1/2010 | Bahl et al. | |
| 7,657,629 B1 | 2/2010 | Kommula | |
| 7,676,576 B1 | 3/2010 | Kommula | |
| 7,734,683 B1 | 6/2010 | Bergenwall et al. | |
| 7,756,965 B2 | 7/2010 | Joshi | |
| 7,840,678 B2 | 11/2010 | Joshi | |
| 7,860,964 B2 | 12/2010 | Brady et al. | |
| 7,885,188 B2 | 2/2011 | Joshi | |
| 7,886,023 B1* | 2/2011 | Johnson | 709/219 |
| 7,899,899 B2 | 3/2011 | Joshi | |
| 7,899,911 B2 | 3/2011 | Jensen et al. | |
| 7,925,713 B1* | 4/2011 | Day et al. | 709/217 |
| 7,949,757 B2 | 5/2011 | Joshi | |
| 8,024,441 B2 | 9/2011 | Kommula et al. | |
| 8,527,639 B1 | 9/2013 | Liskov et al. | |
| 2001/0049741 A1 | 12/2001 | Skene et al. | |
| 2001/0052016 A1 | 12/2001 | Skene et al. | |
| 2002/0026551 A1 | 2/2002 | Kamimaki et al. | 710/260 |
| 2002/0038360 A1 | 3/2002 | Andrews et al. | |
| 2002/0049778 A1 | 4/2002 | Bell et al. | |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | 709/225 |
| 2002/0078233 A1 | 6/2002 | Biliris et al. | 709/238 |
| 2002/0087722 A1 | 7/2002 | Datta et al. | |
| 2002/0091840 A1 | 7/2002 | Pulier et al. | 709/228 |
| 2002/0107841 A1 | 8/2002 | Hellerstein et al. | |
| 2002/0112036 A1 | 8/2002 | Bohannon et al. | 709/220 |
| 2002/0120743 A1 | 8/2002 | Shabtay et al. | 709/226 |
| 2002/0120763 A1 | 8/2002 | Miloushev et al. | |
| 2002/0124096 A1 | 9/2002 | Loguinov et al. | |
| 2002/0133601 A1 | 9/2002 | Kennamer et al. | |
| 2002/0150048 A1 | 10/2002 | Ha et al. | |
| 2002/0154600 A1 | 10/2002 | Ido et al. | |
| 2002/0156916 A1 | 10/2002 | Watanabe | |
| 2002/0186698 A1 | 12/2002 | Ceniza | |
| 2002/0188862 A1 | 12/2002 | Trethewey et al. | 713/201 |
| 2002/0194324 A1 | 12/2002 | Guha | |
| 2002/0194335 A1 | 12/2002 | Maynard | 709/225 |
| 2003/0018796 A1 | 1/2003 | Chou et al. | |
| 2003/0031185 A1 | 2/2003 | Kikuchi et al. | |
| 2003/0035430 A1 | 2/2003 | Islam et al. | |
| 2003/0065711 A1 | 4/2003 | Acharya et al. | 709/203 |
| 2003/0065762 A1 | 4/2003 | Stolorz et al. | |
| 2003/0065763 A1* | 4/2003 | Swildens et al. | 709/224 |
| 2003/0074472 A1 | 4/2003 | Lucco et al. | |
| 2003/0105797 A1* | 6/2003 | Dolev et al. | 709/105 |
| 2003/0115283 A1 | 6/2003 | Babir et al. | |
| 2003/0135509 A1 | 7/2003 | Davis et al. | 707/100 |
| 2003/0154239 A1 | 8/2003 | Davis et al. | |
| 2003/0177240 A1 | 9/2003 | Gulko et al. | |
| 2003/0210686 A1 | 11/2003 | Terrell et al. | 370/389 |
| 2003/0210694 A1 | 11/2003 | Jayaraman et al. | 370/392 |
| 2003/0229697 A1 | 12/2003 | Borella | |
| 2004/0019680 A1 | 1/2004 | Chao et al. | |
| 2004/0024872 A1 | 2/2004 | Kelley et al. | 709/225 |
| 2004/0039798 A1 | 2/2004 | Hotz et al. | |
| 2004/0039847 A1 | 2/2004 | Persson et al. | |
| 2004/0064577 A1 | 4/2004 | Dahlin et al. | |
| 2004/0194102 A1 | 9/2004 | Neerdaels | |
| 2004/0249939 A1 | 12/2004 | Amini et al. | |
| 2004/0249971 A1 | 12/2004 | Klinker | |
| 2004/0255018 A1 | 12/2004 | Taraci | |
| 2004/0259565 A1 | 12/2004 | Lucidarme | |
| 2005/0002410 A1 | 1/2005 | Chao et al. | |
| 2005/0021883 A1 | 1/2005 | Shishizuka et al. | 710/20 |
| 2005/0033858 A1* | 2/2005 | Swildens et al. | 709/232 |
| 2005/0086295 A1 | 4/2005 | Cunningham et al. | 709/203 |
| 2005/0149531 A1 | 7/2005 | Srivastava | 707/10 |
| 2005/0169180 A1 | 8/2005 | Ludwig | |
| 2005/0286416 A1 | 12/2005 | Shimonishi et al. | |
| 2006/0020715 A1 | 1/2006 | Jungck | |
| 2006/0036743 A1 | 2/2006 | Deng et al. | |
| 2006/0167894 A1 | 7/2006 | Wunner | |
| 2006/0209689 A1 | 9/2006 | Nakano et al. | |
| 2007/0168448 A1 | 7/2007 | Garbow et al. | |
| 2007/0168547 A1 | 7/2007 | Krywaniuk | |
| 2007/0180113 A1 | 8/2007 | Van Bemmel | |
| 2007/0208877 A1 | 9/2007 | Kelley et al. | |
| 2008/0016233 A1 | 1/2008 | Schneider | |
| 2008/0037420 A1 | 2/2008 | Tang | |
| 2008/0123597 A1 | 5/2008 | Arbol et al. | |
| 2008/0144784 A1 | 6/2008 | Limberg | |
| 2008/0147866 A1 | 6/2008 | Stolorz et al. | |
| 2008/0207200 A1 | 8/2008 | Fein et al. | |
| 2010/0010991 A1 | 1/2010 | Joshi | |
| 2010/0011120 A1 | 1/2010 | Kommula | |
| 2010/0011126 A1 | 1/2010 | Hsu et al. | |
| 2010/0082787 A1 | 4/2010 | Kommula et al. | |
| 2010/0095008 A1 | 4/2010 | Joshi | |
| 2010/0115133 A1 | 5/2010 | Joshi | |
| 2010/0121932 A1 | 5/2010 | Joshi et al. | |
| 2010/0153558 A1 | 6/2010 | Kommula | |
| 2010/0223621 A1 | 9/2010 | Joshi | |
| 2010/0251008 A1 | 9/2010 | Swildens | |
| 2010/0293296 A1 | 11/2010 | Hsu et al. | |
| 2010/0299427 A1 | 11/2010 | Joshi | |
| 2011/0099261 A1 | 4/2011 | Joshi | |
| 2011/0122771 A1 | 5/2011 | Joshi | |
| 2011/0191459 A1 | 8/2011 | Joshi | |
| 2011/0264798 A1 | 10/2011 | Joshi | |
| 2012/0096166 A1 | 4/2012 | Devarapalli et al. | |

OTHER PUBLICATIONS

Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.

Devarapalli et al., U.S. Appl. No. 61/393,796, filed Oct. 15, 2010.

Devarapalli et al., U.S. Appl. No. 12/916,390, filed Oct. 29, 2010.

Joshi, U.S. Appl. No. 12/938,232, filed Nov. 2, 2010.

Network Working Group, Request for Comments (RFC) 4033, "DNS Security Introduction and Requirements," Mar. 2005, 22 pages.

Network Working Group, Request for Comments (RFC) 4034, "Resource Records for the DNS Security Extensions," Mar. 2005, 31 pages.

Network Working Group, Request for Comments (RFC) 4035, "Protocol Modifications for the DNS Security Extensions," Mar. 2005, 55 pages.

National Institute of Standards and Technology (NIST), "Secure Domain Name System (DNS) Deployment Guide," Special Publication 800-81, May 2006, 103 pages.

CMP Media LLC, "VeriSign DNSSEC Interop Lab Adds Brocade, A10 Networks, BlueCat Networks," Jun. 29, 2010, can be retrieved from http://www.darkreading.com/story/showArticle.jhtml?articleID=225701776, 3 pages.

Meyer, Nathan et al., "F5 and Infoblox DNS Integrated Architecture: Offering a Complete Scalable, Secure DNS Solution," A F5 Networks, Inc. Technical Brief, 2010, 18 pages, Seattle, WA.

(56) References Cited

OTHER PUBLICATIONS

Silva, Peter, "DNSSEC: The Antidote to DNS Cache Poisoning and Other DNS Attacks," A F5 Networks, Inc. Technical Brief, 2009, 10 pages, Seattle, WA.

Wikimedia Foundation, Inc., "Domain Name Security Extensions," retrieved Oct. 22, 2010, from http://en.wikipedia.org/wiki/Domain_Name_System_Security_Extensions, 17 pages.

A10 Networks, Inc., "A10 Networks Announces Unique and Wide Ranging Customer-Driven Functionality for AX Series Application Delivery Controllers," News Release, Oct. 18, 2010, from http://www.a10networks.com/news/2010/101018-AX_Series_2.6.php, 2 pages.

Civil Action 10-332, Report on the Filing or Determination of an Action Regarding a Patent or Trademark, filed on Aug. 5, 2010, 2 pages.

Civil Action 10-332, Notice of Voluntary Dismissal Without Prejudice, filed on Aug. 5, 2010, 2 pages.

Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.

Civil Action CV10-03428, First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages.

Non-Final Office Action for U.S. Appl. No. 12/496,560, mailed on Sep. 17, 2010, 27 pages.

Genova, Z., et al., "Challenges to URL Switching for Implementing Globally Distributed Web Sites," Department of Computer Science and Engineering, University of South Florida, pp. 1-9, Aug. 11, 2000.

Joshi, U.S. Appl. No. 13/008,321, filed Jan. 18, 2011, 36 pages.

Joshi, U.S. Appl. No. 13/023,292, filed Feb. 8, 2011, 30 pages.

Final Office Action for U.S. Appl. No. 12/496,560, mailed on Jan. 28, 2011, 10 pages.

Final Office Action for U.S. Appl. No. 12/272,618, mailed on Nov. 26, 2010, 19 pages.

Office Action for U.S. Appl. No. 11/707,697, mailed on Nov. 22, 2010, 24 pages.

Notice of Allowance for U.S. Appl. No. 12/177,021, mailed Dec. 10, 2010, 20 pages.

U.S. Appl. No. 11/707,697, filed Feb. 16, 2007, entitled "Global Server Load Balancing," inventor: Sunanda L. Kommula et al.

Final Office Action, mailed Aug. 12, 2010, for U.S. Appl. No. 12/177,021, 6 pages.

Notice of Allowance for U.S. Appl. No. 12/506,130, mailed on Oct. 12, 2010, 49 pages.

Non-Final Office Action for U.S. Appl. No. 12/635,371, mailed on Oct. 7, 2010, 44 pages.

Non-Final Office Action for U.S. Appl. No. 12/506,137, mailed on Oct. 7, 2010, 26 pages.

Hsu et al., "Global Server Load Balancing," U.S. Appl. No. 12/272,618, filed Nov. 17, 2008.

Joshi, "Configurable Geographic Prefixes for Global Server Load Balancing," U.S. Appl. No. 12/353,701, filed Jan. 14, 2009.

Hsu et al., "Global Server Load Balancing," U.S. Appl. No. 12/496,560, filed Jul. 1, 2009.

Joshi, "Host-Level Policies for Global Server Load Balancing," U.S. Appl. No. 12/506,130, filed Jul. 20, 2009.

Kommula, "Canonical Name (Cname) Handling for Global Server Load Balancing," U.S. Appl. No. 12/506,137, filed Jul. 20, 2009.

Doeringer et al., "Routing on Longest-Matching Prefixes," IEEE/ACM Transactions on Networking, Feb. 1996, pp. 86-97, vol. 4, No. 1.

Office Action, issued in U.S. Appl. No. 10/211,822, mailed Aug. 19, 2005.

Notice of Allowance, issued in U.S. Appl. No. 10/211,822, mailed Mar. 7, 2006.

Office Action, issued in U.S. Appl. No. 10/377,364, mailed Sep. 22, 2006.

Office Action, issued in U.S. Appl. No. 10/377,364, mailed Mar. 26, 2007.

Office Action, issued in U.S. Appl. No. 10/377,364, mailed Sep. 4, 2007.

Office Action, issued in U.S. Appl. No. 10/377,364, mailed Apr. 9, 2008.

Office Action, issued in U.S. Appl. No. 10/377,364, mailed Nov. 24, 2008.

Office Action, issued in U.S. Appl. No. 10/377,364, mailed Aug. 31, 2009.

Advisory Action, issued in U.S. Appl. No. 10/377,364, mailed Nov. 23, 2009.

Office Action, issued in U.S. Appl. No. 10/206,580, mailed Aug. 15, 2005.

Office Action, issued in U.S. Appl. No. 10/206,580, mailed Mar. 9, 2006.

Advisory Action, issued in U.S. Appl. No. 10/206,580, mailed Jun. 6, 2006.

Office Action, issued in U.S. Appl. No. 10/206,580, mailed Jul. 12, 2006.

Notice of Allowance, issued in U.S. Appl. No. 10/206,580, mailed Jan. 11, 2007.

Office Action, issued in U.S. Appl. No. 10/376,903, mailed Jul. 17, 2006.

Office Action, issued in U.S. Appl. No. 10/376,903, mailed Jan. 12, 2007.

Office Action, issued in U.S. Appl. No. 10/376,903, mailed Jun. 5, 2007.

Office Action, issued in U.S. Appl. No. 10/376,903, mailed Feb. 20, 2008.

Office Action, issued in U.S. Appl. No. 10/376,903, mailed Oct. 16, 2008.

Office Action, issued in U.S. Appl. No. 11/707,697, mailed Mar. 3, 20009.

Office Action, issued in U.S. Appl. No. 11/707,697, mailed Sep. 17, 2009.

Office Action, issued in U.S. Appl. No. 10/214,921, mailed Feb. 7, 2006.

Office Action, issued in U.S. Appl. No. 10/214,921, mailed Aug. 9, 2006.

Advisory Action, issued in U.S. Appl. No. 10/214,921, mailed Sep. 21, 2006.

Office Action, issued in U.S. Appl. No. 10/214,921, mailed Dec. 7, 2006.

Office Action, issued in U.S. Appl. No. 10/214,921, mailed Aug. 13, 2007.

Office Action, issued in U.S. Appl. No. 10/214,921, mailed Nov. 15, 2007.

Office Action, issued in U.S. Appl. No. 10/214,921, mailed Jun. 12, 2008.

Office Action, issued in U.S. Appl. No. 10/214,921, mailed Oct. 6, 2008.

Notice of Allowance, issued in U.S. Appl. No. 10/214,921, mailed Apr. 3, 2009.

Office Action, issued in U.S. Appl. No. 10/305,823, mailed Jan. 12, 2006.

Office Action, issued in U.S. Appl. No. 10/305,823, mailed Jul. 3, 2006.

Office Action, issued in U.S. Appl. No. 10/305,823, mailed Jan. 3, 2007.

Office Action, issued in U.S. Appl. No. 10/305,823, mailed Sep. 10, 2007.

Office Action, issued in U.S. Appl. No. 10/305,823, mailed Mar. 24, 2008.

Advisory Action, issued in U.S. Appl. No. 10/305,823, mailed Jul. 9, 2008.

Examiner's Answer, issued in U.S. Appl. No. 10/305,823, mailed Mar. 4, 2009.

Supplemental Examiner's Answer, issued in U.S. Appl. No. 10/305,823, mailed Apr. 13, 2009.

(56) References Cited

OTHER PUBLICATIONS

Office Action, issued in U.S. Appl. No. 10/674,627, mailed Jun. 5, 2006.
Office Action, issued in U.S. Appl. No. 10/674,627, mailed Nov. 3, 2006.
Office Action, issued in U.S. Appl. No. 10/674,627, mailed Jul. 30, 2007.
Office Action, issued in U.S. Appl. No. 10/674,627, mailed Apr. 11, 2008.
Office Action, issued in U.S. Appl. No. 10/674,627, mailed Dec. 23, 2008.
Office Action, issued in U.S. Appl. No. 10/674,627, mailed Aug. 3, 2009.
AlteonWebSystems, "PCD White Paper," *AlteonWebSystems*, pp. 1-8, Mar. 2001.
Cardellini, V., et al., "Dynamic Load Balancing on Web-server Systems," *IEEE Internet Computing*, 3(3):28-39, May-Jun. 1999.
Foundry Networks, Inc., "Server Load Balancing in Today's Web-enabled Enterprises," *White Paper*, pp. 1-10, Apr. 2002.
Genova, Z., et al., "Challenges in URL Switching for Implementing Globally Distributed Web Sites," *IEEE*, pp. 89-94, 2000.
Albitz, P., et al., "DNS and BIND in a Nutshell," O'Reilly & Associates, Sebastopol, CA, 1992, pp. 214-215.
Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.
Alteon WebSystems, Inc., "Enhancing Web User Experience with Global Server Load Balancing," Jun. 1999, 8 pages.
Bestavros, Azer, "WWW Traffic Reduction and Load Balancing through Server-Based Caching," *IEEE Concurrency*, pp. 56-67, Jan.-Mar. 1997.
Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.
U.S. Appl. No. 10/211,822, filed Aug. 1, 2002, Joshi et al.
U.S. Appl. No. 10/206,580, filed Jul. 25, 2002, Kommula et al.
Nortel Networks, "Alteon Personal Content Director," © 2001, can be retrieved from http://www.nortelnetworks.com/personalinternet, 4 pages.
IBM Corp., *IBM WebSphere Performance Pack: Load Balancing with IBM SecureWay Network Dispatcher*, First Edition, Chapters 1, 2, 4, and 8, Oct. 1999.
IBM Corp., *SecureWay® Network Dispatcher: User's Guide—Version 2.1 for AIX, Solaris, and Windows NT*, Third Edition, Chapters 3, 4, 9, 10, 11, and Appendices C & E, Mar. 1999.
U.S. Appl. No. 10/214,921, filed Aug. 7, 2002, Kommula.
U.S. Appl. No. 10/305,823, filed Nov. 27, 2002, Joshi et al.
U.S. Appl. No. 10/377,364, filed Feb. 28, 2003, Kommula.
U.S. Appl. No. 10/376,903, filed Feb. 28, 2003, Kommula.
U.S. Appl. No. 10/674,627, filed Sep. 29, 2003, Joshi.
U.S. Appl. 10/839,919, filed May 6, 2004, Joshi.
U.S. Appl. No. 10/840,496, filed May 6, 2004, Joshi.
U.S. Appl. No. 10/924,552, filed Aug. 23, 2004, Joshi.
Paul, Arindam et al., "Balancing Web Server Load for Adaptable Video Distribution," *IEEE* pp. 469-476, 2000.
Yerxa, G., "ACElerate on Fast Track for Load-Balancing," Mar. 8, 1999, retrieved Nov. 5, 2002, from http://www.networkcomputing.com/1005/1005sp2.html, pp. 1-4.
F5 Networks, Inc., "Keeping Up with Multi-Service Applications," A F5 Networks, Inc. White Paper Document, Jan. 2006, 8 pages, Seattle, WA.
Citrix Systems, Inc., "NetScaler Global Server Load Balancing for Presentation Server and Access Gateway (All Editions) Deployments," Design Consideration NetScaler 8.0, 2007, 16 pages, Fort Lauderdale, FL.
F5 Networks, Inc., "Optimize Application Delivery Across Your Globally Distributed Data Centers," BIG-IP Global Traffic Manager Datasheet, 2009, 8 pages, Seattle WA.
Stalvig, P., "Disaster Recovery: Not Just Planning for the Worst," A F5 Networks, Inc. White Paper Document, 2008, 16 pages, F5 Networks, Inc., Seattle, WA.
Cisco Systems, Inc., "The Global Server Load Balancing Primer," A Cisco Systems, Inc. White Paper Document, 1992-2004, 20 pages, San Jose, CA.
Kommula, U.S. Appl. No. 12/787,779, filed May 26, 2010.
Notice of Allowance, issued in U.S. Appl. No. 10/377,364, mailed Jan. 12, 2010.
Notice of Allowance, issued in U.S. Appl. No. 12/353,701, mailed Apr. 9, 2010.
Office Action, issued in U.S. Appl. No. 12/177,021, mailed Jan. 29, 2010.
Office Action, issued in U.S. Appl. No. 12/272,618, mailed Feb. 4, 2010.
Office Action, issued in U.S. Appl. No. 11/707,697, mailed Jan. 12, 2010.
Kommula et al., "Global Server Load Balancing," assigned U.S. Appl. No. 11/707,697, filed Feb. 16, 2007.
Joshi, "Smoothing Algorithm for Round Trip Time (RTT) Measurements," assigned U.S. Appl. No. 12/177,021, filed Jul. 21, 2008.
Non-Final Office Action, mailed on Sep. 29, 2009, for U.S. Appl. No. 12/272,618, 16 pages.
Notice of Allowance, mailed Jul. 6, 2007, for U.S. Appl. No. 10/206,580, 5 pages.
Notice of Allowance, mailed on Oct. 19, 2009, for U.S. Appl. No. 10/376,903, 4 pages.
Notice of Allowance, mailed on Aug. 19, 2010, for U.S. Appl. No. 10/674,627, 4 pages.
Civil Action 10-332, Complaint for Patent Infringement with Exhibits A-G, filed on Apr. 23, 2010, 131 pages.
Civil Action 10-332, Second Amended and Supplemental Complaint for Patent Infringement with Exhibits H-I, filed on Jul. 16, 2010, 41 pages.
Civil Action CV10-03443, Complaint for Declaratory Judgment with Exhibits A-I, filed on Aug. 6, 2010, 153 pages.
U.S. Appl. No. 09/670,487, filed Sep. 26, 2000, Hsu et al..
U.S. Appl. No. 10/337,364, filed Feb. 28, 2003, Kommula.
U.S. Appl. No. 10/839,919, filed May 6, 2004, Joshi.
Advisory Action, issued in U.S. Appl. No. 10/674,627, mailed Oct. 16, 2009.
Notice of Allowance, issued in U.S. Appl. No. 10/839,919, mailed Mar. 5, 2008.
Office Action, issued in U.S. Appl. No. 10/839,919, mailed Jun. 18, 2008.
Office Action, issued in U.S. Appl. No. 10/839,919, mailed Dec. 9, 2008.
Notice of Allowance, issued in U.S. Appl. No. 10/839,919, mailed May 14, 2009.
Office Action, issued in U.S. Appl. No. 10/840,496, mailed Oct. 18, 2007.
Office Action, issued in U.S. Appl. No. 10/840,496, mailed Aug. 1, 2008.
Notice of Allowance, issued in U.S. Appl. No. 10/840,496, mailed Oct. 15, 2008.
Office Action, issued in U.S. Appl. No. 12/353,701, mailed Nov. 4, 2009.
Office Action, issued in U.S. Appl. No. 10/924,552, mailed Feb. 27, 2008.
Notice of Allowance, issued in U.S. Appl. No. 10/924,552, mailed May 30, 2008.
Office Action, issued in U.S. Appl. No. 09/670,487, mailed Dec. 31, 2003.
Office Action, issued in U.S. Appl. No. 09/670,487, mailed Sep. 21, 2004.
Office Action, issued in U.S. Appl. No. 09/670,487, mailed Mar. 15, 2005.
Office Action, issued in U.S. Appl. No. 09/670,487, mailed Nov. 3, 2005.
Office Action, issued in U.S. Appl. No. 09/670,487, mailed May 3, 2006.
Office Action, issued in U.S. Appl. No. 09/670,487, mailed Nov. 17, 2006.

(56) References Cited

OTHER PUBLICATIONS

Office Action, issued in U.S. Appl. No. 09/670,487, mailed Oct. 30, 2007.
Office Action, issued in U.S. Appl. No. 09/670,487, mailed Jul. 22, 2008.
Notice of Allowance, issued in U.S. Appl. No. 09/670,487, mailed Sep. 18, 2008.
Office Action, issued in U.S. Appl. No. 11/741,480, mailed Nov. 27, 2007.
Office Action, issued in U.S. Appl. No. 11/741,480, mailed Apr. 29, 2008.
Office Action, issued in U.S. Appl. No. 11/741,480, mailed Oct. 31, 2008.
Notice of Allowance, issued in U.S. Appl. No. 11/741,480, mailed Apr. 10, 2009.
Office Action, issued in U.S. Appl. No. 10/376,903, mailed Mar. 4, 2009.
Joshi; U.S Appl. No. 13/101,398, filed May 5, 2011, 28 pages.
Request for Reexamination of U.S. Patent No. 7,454,500, filed Jun. 27, 2011, 29 pages.
Request for Reexamination of U.S. Patent No. 7,581,009, filed Jun. 27, 2011, 58 pages.
Notice of Allowance for U.S. Appl. No. 12/496,560, mailed on May 16, 2011, 11 pages.
Non-Final Office Action for U.S. Appl. No. 12/272,618, mailed on Jun. 14, 2011, 13 pages.
Request for Reexamination of U.S. Patent No. 7,657,629, filed Jun. 27, 2011, 36 pages.
Order Granting Request for Reexamination of U.S. Patent No. 7,657,629, mailed Jul. 30, 2011, Reexamination Control No. 90/011,766, 10 pages.
Final Office Action for U.S. Appl. No. 11/707,697, mailed on Apr. 20, 2011, 10 pages.
Notice of Allowance for U.S. Appl. No. 11/707,697, mailed on Aug. 5, 2011, 9 pages.
Final Office Action for U.S. Appl. No. 12/635,371, mailed on Mar. 16, 2011, 7 pages.
Non-Final Office Action for U.S. Appl. No. 12/635,371, mailed on Jun. 8, 2011, 9 pages.
Request for Reexamination of U.S. Patent No. 7,574,508, filed Jun. 27, 2011, 21 pages.
Order Granting Request for Reexamination of U.S. Patent No. 7,574,508, mailed Jul. 22, 2011, Reexamination Control No. 90/011,764, 15 pages.
Decision on Appeal for U.S. Appl. No. 10/305,823, mailed on Jul. 11, 2011, 10 pages.
Request for Reexamination of U.S. Patent No. 7,584,301, filed Jun. 27, 2011, 36 pages.
Order Granting Request for Reexamination of U.S. Patent No. 7,584,301, mailed Aug. 8, 2011, Reexamination Control No. 90/011,765, 10 pages.
Request for Reexamination of U.S. Patent No. 7,840,678, filed Jun. 27, 2011, 25 pages.
Order Granting Request for Reexamination of U.S. Patent No. 7,840,678, mailed Jul. 29, 2011, Reexamination Control No. 90/011,763, 10 pages.
Notice of Allowance for U.S. Appl. No. 12/938,232, mailed on Apr. 7, 2011, 51 pages.
Request for Reexamination of U.S. Patent No. 7,756,965, filed Jun. 27, 2011, 38 pages.
Request for Reexamination of U.S. Patent No. 7,899,899, filed Jun. 27, 2011, 24 pages.
Civil Action CV10-03428, Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 13, 2011, 238 pages.
Civil Action CV10-03428, Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Apr. 29, 2011, 42 pages.
Civil Action CV10-03428, Answer to Third Amended Complaint, Affirmative Defenses, and Counterclaims, filed on May 16, 2011, 40 pages.
Civil Action CV10-03428, Answer to Defendant A10 Networks, Inc.'s Counterclaims, and Counterclaim, filed on May 27, 2011, 12 pages.
Delgadillo, K., "Cisco Distributed Director," Cisco White Paper, 1999, 19 pages.
Table of Contents for 2nd Conference on Telecommunications (ConfTele'99), Apr. 15-16, 1999, 9 pages.
Bernardo, L. et al., "Scalability Issues in Telecommunication Services," In Proceedings of 2nd Conference on Telecommunications (ConfTele'99), Apr. 15-16, 1999, pp. 409-413.
Lin, "VPN Tunnel Balancer," U.S. Appl. No. 60/169,502, filed Dec. 7, 1999, 7 pages.
Cisco Systems, Inc., "Cisco LocalDirector Version 1.6.3 Release Notes," Oct. 1997, 52 pages, San Jose, CA.
Foundry Networks, Inc., "Foundry ServerIron Installation and Configuration Guide," May 2000, Table of Contents through Chapter 5, 225 pages.
Foundry Networks, Inc., "Foundry ServerIron Installation and Configuration Guide," May 2000, Chapter 6 through Chapter 10, 207 pages.
Foundry Networks, Inc., "Foundry ServerIron Installation and Configuration Guide," May 2000, Chapter 11 through Appendix C, 352 pages.
Dell Computer Corporation, "3-DNS Reference Guide, Version 4.2," 2002, 261 pages.
Office Action for Reexamination Control No. 90/011,761, mailed Nov. 18, 2011, 12 pages.
Joshi et al., U.S. Appl. No. 13/229,380, filed Sep. 9, 2011.
Schemers III, "lbnamed: A Load Balancing Name Server in Perl," 1995 LISA IX, Sep. 17-22, 1995, Monterey, CA, 13 pages.
Goldszmidt, "Load Distribution for Scalable Web Servers: Summer Olympics 1996," In Proceedings of the 8th IFIP/IEEE International Workshop on Distributed Systems: Operations and Management, Sydney, Australia, Oct. 1997, 10 pages.
"Use F5 Networks' 3DNS Controller to Supercharge Standard DNS Capabilities," Jul. 1999, F5 White Paper, Seattle, WA.
Buyya, "High Performance Cluster Computing: Architectures and Systems," vol. 1, copyright 1999, Prentice Hall PTR, Upper Saddle River, New Jersey 07458, http://www.phptr.com.
Civil Action CV10-03428—A10 Networks, Inc.'s Answer to Plaintiffs Brocade Communications Systems, Inc. and Foundry Networks, LLC's Counterclaims, Filed Jun. 17, 2011, 4 pages.
Civil Action CV10-03428—Notice of Granted Requests for Reexamination of Patents 7,547,508 and 7,270,977, Filed Aug. 1, 2011, 31 pages, including Exhibits A and B.
Civil Action CV10-03428—Notice of Granted Requests for Reexamination of Patents 7,558,195, 7,657,629, 7,840,678, Filed Aug. 5, 2011, 316 pages.
Civil Action CV10-03428—Notice of Granted Requests for Reexamination of Patent 7,584,301, Filed Aug. 12, 2011, 14 pages, including Exhibit A.
Civil Action CV10-03428—Joint Claim Construction, Filed Aug. 26, 2011, 29 pages.
Civil Action CV10-03428—Notice of Granted Requests for Reexamination of Patents 7,774,833; 7,454,500; 7,899,899; 7,754,965; 7,647,427; and 7,716,370, Filed Sep. 6, 2011, 72 pages, including Exhibits A through F.
Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, Filed Jun. 27, 2011, 779 pages, Including Exhibits A through M.
Skene et al., "Method and System for Balancing Load Distribution on a Wide Area Network," U.S. Appl. No. 09/459,815, filed Dec. 13, 1999, 59 pages.

(56) References Cited

OTHER PUBLICATIONS

Skene et al., "Method and System for Name Server Load Balancing," U.S. Appl. No. 60/182,812, filed Feb. 16, 2000, 16 pages.
Tsimelzon et al., "Java application framework for an internet content delivery network," U.S. Appl. No. 60/347,481, filed Jan. 11, 2002, 26 pages.
"Foundry Networks Announces Application Aware Layer 7 Switching on ServerIron Platform," Mar. 1999, 4 pages.
Civil Action CV10-03428, Order Construing Disputed Claim Terms of U.S. Patent Nos. 7,647,427; 7,716,370; 7,558,195; 7,454,500; 7,581,009; 7,657,629; 7,584,301; 7,840,678; and 5,875,185, issued Jan. 6, 2012, 33 pages.
Information Disclosure Statement filed on Apr. 4, 2004, for U.S. Patent No. 7,308,475, 5 pages.
Release Note: 3-DNS Controller, version 4.5, Mar. 5, 2007, 19 pages.
F5 Networks' Newest Wide Area Traffic Management Solution Enables Enterprises to Meet Global e-Business Objectives, Business Wire, Feb. 19, 2002, 4 pages.
Release Note: 3-DNS Controller, version 4.2, Feb. 13, 2002, 23 pages.
Huang et al., "A DNS Reflection Method for Global Traffic Management," Proceedings USENIX Annual Technical Conference (ATC'10), 2010, 7 pages.
Civil Action CV10-03428, Expert Report of J. Douglas Tygar in Support of Defendant and Counterclaimant A10 Networks, Inc.'s, and Defendant Lee Chen's and Rajkumar Jalan's Invalidity Contentions, filed Mar. 23, 2012, 81 pages.
Notice of Reexamination Request Filing Date and Notice of Assignment of Reexamination Request, mailed Jul. 1, 2011, Reexamination Control No. 90/011,772, 2 pages.
Ex Parte Reexamination Interview Summary for Reexamination Control No. 90/011,772, mailed Jul. 21, 2011, 3 pages.
Order Granting Request for Reexamination of U.S. Patent No. 7,454,500, mailed Aug. 12, 2011, Reexamination Control No. 90/011,772, 11 pages.
Office Action for Reexamination Control No. 90/011,772, mailed Oct. 13, 2011, 8 pages.
Decision on Petition for Extension of Time in Reexamination (Granted), mailed Nov. 17, 2011, Reexamination Control No. 90/011,772, 3 pages.
Ex Parte Reexamination Interview Summary for Reexamination Control No. 90/011,772, mailed on Nov. 29, 2011, 58 pages.
Ex Parte Reexamination Interview Summary for Reexamination Control No. 90/011,772, mailed on Apr. 10, 2012, 3 pages.
Final Office Action for Reexamination Control No. 90/011,772, mailed May 17, 2012, 53 pages.
Request for Inter Partes Reexamination of U.S. Patent No. 7,454,500, filed Nov. 4, 2011, 157 pages.
Notice of Assignment of Inter Partes Reexamination Request and Notice of Reexamination Request Filing Date, mailed Nov. 18, 2011, Reexamination Control No. 95/001,806, 2 pages.
Order Granting Request for Inter Partes Reexamination of U.S. Patent No. 7,454,500 and Office Action for Reexamination Control No. 95/001,806, mailed Dec. 16, 2011, 43 pages.
Third Party Requester's Opposition to Petition to Vacate, for Reexamination Control No. 95/001,806, filed Mar. 1, 2012, 15 pages.
Third Party Requester's Opposition to Petition to Suspend Reexamination for Reexamination Control No. 95/001,806, filed Mar. 2, 2012, 14 pages.
Third Party Requester's Comments under 35 U.S.C. § 314(B)(2) and 37 C.F.R. § 1.947, for Reexamination Control No. 95/001,806, filed Mar. 19, 2012, 36 pages.
Third Party Requester's Opposition to Patent Owner's Petition to "Supplement," for Reexamination Control No. 95/001,806, filed Apr. 19, 2012, 21 pages.
Terminal Disclaimer for U.S. Appl. No. 11/741,480, filed Jan. 29, 2008, 1 page.
Notice of Reexamination Request Filing Date and Notice of Assignment of Reexamination Request, mailed Jul. 8, 2011, Reexamination Control No. 90/011,770, 2 pages.

Ex Parte Reexamination Interview Summary, for Reexamination Control No. 90/011,770, mailed Jul. 18, 2011, 2 pages.
Order Granting Request for Reexamination of U.S. Patent No. 7,581,009, mailed Sep. 21, 2011, Reexamination Control No. 90/011,770, 14 pages.
Office Action for Reexamination Control No. 90/011,770, mailed Feb. 16, 2012, 35 pages.
Ex Parte Reexamination Interview Summary, for Reexamination Control No. 90/011,770, mailed Mar. 27, 2012, 3 pages.
Decision on Petition for Extension of Time in Reexamination (Granted), mailed Mar. 28, 2012, Reexamination Control No. 90/011,770, 3 pages.
Request for Inter Partes Reexamination of U.S. Patent No. 7,581,009, filed Nov. 4, 2011, 197 pages.
Notice of Assignment of Inter Partes Reexamination Request and Notice of Reexamination Request Filing Date, mailed Nov. 10, 2011, Reexamination Control No. 95/001,807, 2 pages.
Order Granting Request for Inter Partes Reexamination of U.S. Patent No. 7,581,009 and Office Action for Reexamination Control No. 95/001,807, mailed Jan. 31, 2012, 23 pages.
Decision on Petition for Extension of Time in Reexamination (Granted), mailed Mar. 30, 2012, Reexamination Control No. 95/001,807, 3 pages.
Third Party Requester's Opposition to Petition to Vacate, for Reexamination Control No. 95/001,807, filed Apr. 16, 2012, 17 pages.
Civil Action 10-332—Brocade Communication Systems, Inc. v. A10 Networks, Inc.—Civil Cover Sheet, filed on Apr. 23, 2010, 1 page.
Civil Action—Case No. CV10-03443—Complaint for Declaratory Judgment, filed on Aug. 6, 2010, with Exhibits A through I, 153 pages.
Civil Action—Case No. CV10-03443—Notice of Voluntary Dismissal Without Prejudice, filed on Aug. 16, 2010, 2 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint filed by A10 Networks, Inc., Lee Chen, Rajkumar Jalan, Ron Szeto, filed Oct. 11, 2010, 30 pages.
Civil Action CV10-03428—Defendant, David Cheung's Answer to Plaintiff's First Amended Complaint, filed Nov. 11, 2010, 32 pages.
Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages.
Civil Action CV10-03428—Declaration of Scott R. Mosko in Support of Motion to Dismiss First Amended Complaint, filed by A10 Networks, Inc., Lee Chen, Rajkumar Jalan, Ron Szeto, filed Nov. 12, 2010, 56 pages. Included: Exhibits A and B.
Civil Action CV10-03428—Memorandum in Opposition re Motion to Dismiss First Amended Complaint, filed by Brocade Communications Systems, Inc., Foundry Networks, LLC, filed Jan. 27, 2011, 33 pages.
Civil Action CV10-03428—Reply to Opposition re Motion to Dismiss First Amended Complaint, filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages. Included: Affidavit Declaration of Scott R. Mosko in Support of Motion; Proposed Order, Exhibits 1 and 2.
Civil Action CV10-03428—Opposition to Motion to Stay Proceedings Pending Reexaminations, filed by Brocade Communications Systems, Inc., Foundry Networks, LLC, filed Jul. 15, 2011, 20 pages. Included: Proposed Order.
Civil Action CV10-03428—Declaration of Siddhartha M. Venkatesan in Support of Opposition/Response to Motion, Plaintiffs' Opposition to Defendants' Motion to Stay Proceedings, filed by

(56) References Cited

OTHER PUBLICATIONS

Brocade Communications Systems, Inc., Foundry Networks, LLC, filed Jul. 15, 2011, 70 pages. Included: Exhibits A through E.
Civil Action CV10-03428—Reply to Plaintiffs' Opposition to Defendants' Motion to Stay Proceedings Pending Reexaminations, filed by A10 Networks, Inc., filed Jul. 22, 2011, 34 pages. Included: Declaration of Scott R. Mosko, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 26, 2011, 34 pages. Included: Proposed Order for Temporary Restraining Order and Order to Show Cause and Proposed Preliminary Injunction.
Civil Action CV10-03428—Declaration of Andrew (Andy) Guerrero in Support of Motion for Temporary Restraining Order [Redacted Version] of Plaintiffs' Memorandum in Support of Motion for Temporary Restraining Order and Preliminary Injunction [Redacted version]of Andrew (Andy) Guerrero ISO Plantiffs' Motion for TRO and Preliminary Injunction filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plantiffs' Motion for TRO and Preliminary Injunction filed by Brocade Communications Systems, Inc., Foundry Networks, LLC, filed Jul. 26, 2011, 2 pages.
Civil Action CV10-03428—Declaration of Keith Stewart in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plantiffs' Motion for TRO and Preliminary Injunction filed by Brocade Communications Systems, Inc., Foundry Networks, LLC, filed Jul. 26, 2011, 5 pages.
Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plantiffs' Motion for TRO and Preliminary Injunction filed by Brocade Communications Systems, Inc., Foundry Networks, LLC, filed Jul. 26, 2011, 5 pages.
Civil Action CV10-03428—Declaration of Prasad Aluri in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plantiff' Motion for TRO and Preliminary Injunction filed by Brocade Communications Systems, Inc., Foundry Networks, LLC, filed Jul. 26, 2011, 3 pages.
Civil Action CV10-03428—Declaration of Robert D. Young in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plantiffs' Motion for TRO and Preliminary Injunction filed by Brocade Communications Systems, Inc., Foundry Networks, LLC, filed Jul. 26, 2011, 46 pages. Included: Redacted Exhibits 1 through 8.
Civil Action CV10-03428—Declaration of Lisa McGill in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 506 pages. Included: Exhibits 1 through 30. (due to size, this references will be submitted in three parts).
Civil Action CV10-03428—Plaintiffs' Reply Memorandum in Further Support of Motion for Temporary Restraining Order and Preliminary Injunction[Redacted Version] filed by Brocade Communications Systems, Inc., Foundry Networks, LLC, filed Aug. 4, 2011, 22 pages.
Civil Action CV10-03428—Notice of Errata re Reply Memorandum in Further Support of Motion for Temporary Restraining Order and Preliminary Injunction, filed by Brocade Communications Systems, Inc., Foundry Networks, LLC, filed Aug. 5, 2011, 2 pages.
Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.
Civil Action CV10-03428—Order Denying Motion for Temporary Restraining Order [Redacted Version] of Plaintiffs' Memorandum in Support of Motion for Temporary Restraining Order and Preliminary Injunction, filed by Brocade Communications Systems, Inc., Foundry Networks, LLC, filed Aug. 16, 2011, 5 pages.
Civil Action CV10-03428—Notice of Granted Request for Reexamination of U.S. Patent No. 7,581,009, filed Sep. 27, 2011, 18 pages.
Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.
Civil Action CV10-03428—Redacted Declaration of Dr. Chi Zhang in Support of Opposition to Plaintiffs' Motion for Temporary Restraining Order and Preliminary Injunction, filed by A10 Networks, Inc., filed Sep. 28, 2011, 4 pages.
Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.
Civil Action CV10-03428—Declaration of Teri H.P. Nguyen in Support of Motion for Partial Summary Judgment Notice of Motion and Motion for Partial Summary Judgment on Assignor Estoppel, filed by Brocade Communications Systems, Inc., Foundry Networks, LLC, filed Oct. 11, 2011, 259 pages. Included: Exhibits A through R.
Civil Action CV10-03428—Initial Claim Construction Brief, filed by Brocade Communications Systems, Inc., Foundry Networks, LLC, filed Oct. 11, 2011, 31 pages.
Civil Action CV10-03428—Declaration of Nitin Gambhir of Brocade Communications Systems, Inc. and Foundry Networks, LLC's Motion for Summary Judgment of Infringement of U.S. Patent Nos. 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.
Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.
Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.
Civil Action CV10-03428—Declaration of Nitin Gambhir in Support of Brocade Communications, Inc. and Foundry Networks, LLCs Motion for Summary Judgment of Infringement of U.S. Patent Nos. 7,454,500; 7,581,009; 7,657,629; 7,584,301; and 7,840,678, filed by Brocade Communications Systems, Inc., Foundry Networks, LLC, filed Oct. 21, 2011, 162 pages.
Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel, filed by A10 Networks, Inc., Lee Chen, Rajkumar Jalan, Ron Szeto, filed Nov. 8, 2011, 17 pages.
Civil Action CV10-03428—Responsive Claim-Construction Brief (PLR 4-5(b)) by A10 Networks, Inc., Lee Chen, Rajkumar Jalan, filed Nov. 15, 2011, 28 pages.
Civil Action CV10-03428—Declaration of Scott R. Mosko in Support of Defendant and Counterclaimant A10 Networks, Inc.'s and

(56) References Cited

OTHER PUBLICATIONS

Defendants Lee Chen's and Rajkumar Jalan's Responsive Claim Construction Brief (PLR 4-5(b)) filed by A10 Networks, Inc., Lee Chen, Rajkumar Jalan, filed Nov. 15, 2011, 70 pages. Included: Exhibits A through F.
Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.
Civil Action CV10-03428—Opposition re Motion for Summary Judgment of Noninfringement of U.S. Patent No. 5,875,185; Motion for Partial Summary Judgment of U.S. Patent Nos. 7,454,500; 7,581,009; 7,657,629; 7,584,301; and 7,840,678, filed by A10 Networks, Inc., Lee Chen, Rajkumar Jalan, filed Nov. 15, 2011, 20 pages.
Civil Action CV10-03428—Declaration of Scott R. Mosko in Support of Defendant and Counterclaimant A10 Networks, Inc.s, and Defendants Lee Chens and Rajkumar Jalans Opposition to Plaintiffs Brocade Communications, Inc. and Foundry Networks, LLCs Motion for Partial Summary Judgment of U.S. Patent Nos. 7,454,500; 7,581,009; 7,657,629; 7,584,301; and 7,840,678 filed by A10 Networks, Inc., Lee Chen, Rajkumar Jalan, filed Nov. 15, 2011, 16 pages.
Civil Action CV10-03428—Administrative Motion to Consider Whether Cases Should be Related, filed by Brocade Communications Systems, Inc., Foundry Networks, LLC, filed Nov. 21, 2011, 8 pages. Included: Declaration and Proposed Order.
Civil Action CV10-03428—Reply Claim Construction Brief filed by Brocade Communications Systems, Inc., Foundry Networks, LLC, filed Nov. 22, 2011, 22 pages.
Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages. Included: Exhibit A.
Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.
Civil Action CV10-03428—Declaration of Scott A. Herbst Declaration of Scott A. Herbst in Support of Defendant and Counterclaimant A10 Networks, Inc.s and Defendants Lee Chens, Rajkumar Jalans, Ron Szetos, and Steve Hwangs Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 25 pages. Included: Exhibits 1 through 6.
Civil Action CV10-03428—Litigation Docket, printed on Nov. 26, 2011, 2011, 44 pages.
Civil Action CV10-03428—Stipulation Regarding Plaintiffs' Motion for Partial Summary Judgment of Assignor Estoppel, filed Nov. 30, 2011, 2 pages.
Civil Action CV10-03428—Brocade's Opposition to Defendant's Motion to Stay Proceedings Pending Reexaminations, filed Dec. 7, 2011, 18 pages.
Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Partes Reexaminations (All Patents Asserted by Plaintiffs), Filed Dec. 14, 2011, 11 pages.
Civil Action CV10-03428—Defendant and Counterclaimant A10 Networks, Inc.'s Notice of Granted Requests for Inter Partes Reexamination of Plaintiffs' U.S. Patent Nos. 7,558,195; 7,454,500; 7,574,508; and 7,720,977, filed Dec. 28, 2011, 3 pages.
Civil Action CV10-03428—Defendant and Counterclaimant A10 Networks, Inc.'s Notice of Granted Request for Inter Partes Reexamination of Plaintiffs' U.S. Patent No. 7,581,301, filed Dec. 29, 2011, 3 pages.
Civil Action CV10-03428—Defendant and Counterclaimant A10 Networks, Inc.'s Notice of Granted Request for Inter Partes Reexamination of Plaintiffs' U.S. Patent Nos. 7,657,629 and 7,840,678, filed Jan. 20, 2012, 3 pages.
Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Patent Nos. 7,774,833; 7,647,427; 7,716,370; 7,581,009); and (ii) Status Updated for Eleven Already-Instituted Reexaminations (U.S. Patent Nos. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 3 pages.
Civil Action CV10-03428—Defendant and Counterclaimant A10 Networks, Inc.'s Notice of Granted Request for Inter Partes Reexamination of Plaintiffs' U.S. Patent No. 7,756,965 and Status Update, filed Feb. 16, 2012, 3 pages.
Office Communication for U.S. Appl. No. 12/496,560, mailed on Jun. 14, 2011, 5 pages.
Final Office Action for U.S. Appl. No. 12/272,618, mailed on Feb. 28, 2012, 12 pages.
Notice of Reexamination Request Filing Date and Notice of Assignment of Reexamination Request, mailed Jul. 7, 2011, Reexamination Control No. 90/011,766, 2 pages.
Ex Parte Interview Summary for Reexamination Control No. 90/011,766, Jul. 14, 2011, 3 pages.
Office Action for Reexamination Control No. 90/011,766, mailed on Oct. 4, 2011, 7 pages.
Ex Parte Reexamination Interview Summary for Reexamination Control No. 90/011,766, mailed on Nov. 29, 2011, 57 pages.
Decision on Petition for Extension of Time in Reexamination (Granted), mailed Dec. 2, 2011, Reexamination Control No. 90/011,766, 3 pages.
Request for Inter Partes Reexamination for U.S. Patent No. 7,657,629 B1, filed Nov. 17, 2011, 238 pages.
Notice of Inter Partes Reexamination Request Filing Date and Notice of Assignment of Inter Partes Reexamination Request, mailed Dec. 5, 2011, Reexamination Control No. 95/001,824, 2 pages.
Order Granting Request for Inter Partes Reexamination of U.S. Patent No. 7,657,629 and Office Action for Reexamination Control No. 95/001,824, mailed Jan. 12, 2012, 33 pages.
Third Party Requester's Comments under 35 U.S.C. § 314(B)(2) and 37 C.F.R. § 1.947, for Reexamination Control No. 95/001,824, filed Apr. 11, 2012, 21 pages.
Notice of Allowance for U.S. Appl. No. 11/707,697, mailed Aug. 12, 2011, 6 pages.
Office Communication for U.S. Appl. No. 12/635,371, mailed on Mar. 24, 2011, 29 pages.
Non-Final Office Action for U.S. Appl. No. 12/635,371, mailed on Feb. 15, 2012, 10 pages.
Notice of Reexamination Request Filing Date and Notice of Assignment of Reexamination Request, mailed Jun. 29, 2011, Reexamination Control No. 90/011,764, 2 pages.
Ex Parte Interview Summary for Reexamination Control No. 90/011,764, Jul. 21, 2011, 3 pages.
Office Action for Reexamination Control No. 90/011,764, mailed on Nov. 14, 2011, 18 pages.
Office Action for Reexamination Control No. 90/011,764, mailed on Nov. 18, 2011, 18 pages.
Decision on Petition for Extension of Time in Reexamination (Granted), mailed Jan. 3, 2012, Reexamination Control No. 90/011,764, 3 pages.
Ex Parte Reexamination Interview Summary for Reexamination Control No. 90/011,764, mailed on Jan. 6, 2012, 52 pages.
Request for Inter Partes Reexamination of U.S. Patent No. 7,574,508, filed Nov. 4, 2011, 70 pages.
Notice of Inter Partes Reexamination Request Filing Date and Notice of Assignment of Inter Partes Reexamination Request, mailed Nov. 8, 2011, Reexamination Control No. 95/001,804, 2 pages.
Order Granting Request for Inter Partes Reexamination of U.S. Patent No. 7,574,508 and Office Action for Reexamination Control No. 95/001,804, mailed Dec. 8, 2011, 20 pages.

(56) References Cited

OTHER PUBLICATIONS

Third Party Requester's Comments under 35 U.S.C. § 314(B)(2) and 37 C.F.R. § 1.947, with Exhibits A-E, for Reexamination Control No. 95/001,804, filed Mar. 9, 2012, 79 pages.
Non-Final Office Action for U.S. Appl. No. 12/506,137, mailed on Nov. 23, 2011, 63 pages.
Decision on Request for Rehearing for U.S. Appl. No. 10/305,823, mailed on Nov. 1, 2011, 5 pages.
Notice of Reexamination Request Filing Date and Notice of Assignment of Reexamination Request, mailed Jul. 6, 2011, Reexamination Control No. 90/011,765, 2 pages.
Ex Parte Interview Summary for Reexamination Control No. 90/011,765, Jul. 6, 2011, 3 pages.
Office Action in Ex Parte Reexamination for Control No. 90/011,765, mailed on Oct. 13, 2011, 7 pages.
Ex Parte Reexamination Interview Summary for Reexamination Control No. 90/011,765, mailed on Nov. 29, 2011, 57 pages.
Decision on Petition for Extension of Time in Reexamination (Granted), mailed Dec. 9, 2011, Reexamination Control No. 90/011,765, 3 pages.
Final Office Action for Reexamination Control No. 90/011,765, mailed May 16, 2012, 59 pages.
Request for Inter Partes Reexamination of U.S. Patent No. 7,584,301, filed Nov. 8, 2011, 194 pages.
Notice of Inter Partes Reexamination Request Filing Date and Notice of Assignment of Inter Partes Reexamination Request, mailed Nov. 21, 2011, Reexamination Control No. 95/001,812, 2 pages.
Order Granting Request for Inter Partes Reexamination of U.S. Patent No. 7,584,301 and Office Action for Reexamination Control No. 95/001,812, mailed Dec. 28, 2011, 25 pages.
Third Party Requester's Comments under 35 U.S.C. § 314(B)(2) and 37 C.F.R. § 1.947, for Reexamination Control No. 95/001,812, filed Mar. 29, 2012, 33 pages.
Action Closing Prosecution, for Reexamination Control No. 95/001,812, mailed Jun. 2, 2012, 49 pages.
Notice of Reexamination Request Filing Date and Notice of Assignment of Reexamination Request, mailed Jul. 1, 2011, Reexamination Control No. 90/011,763, 2 pages.
Ex Parte Interview Summary for Reexamination Control No. 90/011,763, mailed Jul. 5, 2011, 3 pages.
Office Action for Reexamination Control No. 90/011,763, mailed Oct. 4, 2011, 7 pages.
Decision on Petition for Extension of Time in Reexamination (Granted), mailed Nov. 17, 2011, Reexamination Control No. 90/011,763, 3 pages.
Ex Parte Reexamination Interview Summary for Reexamination Control No. 90/011,763, mailed on Nov. 29, 2011, 57 pages.
Final Office Action for Reexamination Control No. 90/011,763, mailed on Apr. 25, 2012, 51 pages.
Request for Inter Partes Reexamination for U.S. Patent No. 7,840,678, mailed on Nov. 17, 2011, 164 pages.
Notice of Inter Partes Reexamination Request Filing Date and Notice of Assignment of Inter Partes Reexamination Request, mailed Nov. 23, 2011, Reexamination Control No. 95/001,822, 2 pages.
Order Granting Request for Inter Partes Reexamination of U.S. Patent No. 7,840,678 and Office Action for Reexamination Control No. 95/001,822, mailed Jan. 12, 2012, 21 pages.
Third Party Requester's Comments under 35 U.S.C. § 314(B)(2) and 37 C.F.R. § 1.947, for Reexamination Control No. 95/001,822, filed Apr. 11, 2012, 37 pages.
Action Closing Prosecution, for Reexamination Control No. 95/001,822, mailed May 5, 2012, 45 pages.
Non-Final Office Action for U.S. Appl. No. 13/101,398, mailed on Nov. 10, 2011, 58 pages.
Non-Final Office Action for U.S. Appl. No. 10/840,496, mailed on Oct. 18, 2007, 23 pages.
Final Office Action for U.S. Appl. No. 10/840,496 mailed on Aug. 1, 2008, 20 pages.
Notice of Allowance for U.S. Appl. No. 10/840,496, mailed on Oct. 15, 2008, 44 pages.
Non-Final Office Action for U.S. Appl. No. 12/353,701, mailed on Nov. 4, 2009, 22 pages.
Notice of Allowance for U.S. Appl. No. 12/353,701, mailed on Apr. 9, 2010, 15 pages.
Request for Reexamination of U.S. Patent No. 7,756,965, filed Jun. 27, 2011, 57 pages.
Notice of Reexamination Request Filing Date and Notice of Assignment of Reexamination Request, mailed Jun. 30, 2011, Reexamination Control No. 90/011,761, 2 pages.
Ex Parte Interview Summary for Reexamination Control No. 90/011,761, mailed Jul. 6, 2011, 3 pages.
Order Granting Request for Reexamination of U.S. Patent No. 7,756,965, mailed Aug. 19, 2011, Reexamination Control No. 90/011,761, 9 pages.
Office Action for Reexamination Control No. 90/011,761, mailed Nov. 18, 2011, 13 pages.
Decision on Petition for Extension of Time in Reexamination (Granted), mailed Jan. 3, 2012, Reexamination Control No. 90/011,761, 3 pages.
Final Office Action with Interview Summary for Reexamination Control No. 90/011,761, mailed on Mar. 26, 2012, 17 pages.
Advisory Action for Reexamination Control No. 90/011,761, mailed on Jul. 17, 2012, 11 pages.
Notification of Non-Compliant Appeal Brief, for Reexamination Control No. 90/011,761, mailed on Oct. 24, 2012, 4 pages.
Request for Inter Partes Reexamination for U.S. Patent No. 7,756,965 B1, filed Nov. 18, 2011, 189 pages.
Notice of Inter Partes Reexamination Request Filing Date and Notice of Assignment of Inter Partes Reexamination Request, mailed Dec. 1, 2011, Reexamination Control No. 95/001,827, 2 pages.
Order Granting Request for Inter Partes Reexamination of U.S. Patent No. 7,756,965 and Office Action, mailed Feb. 13, 2012, Reexamination Control No. 95/001,827, 18 pages.
Decision on Petition for Extension of Time in Reexamination (Granted), mailed Mar. 30, 2012, Reexamination Control No. 95/001,827, 3 pages.
Third Party Requester's Comments under 35 U.S.C. § 314(B)(2) and 37 C.F.R. § 1.947, for Reexamination Control No. 95/001,827, filed Jun. 13, 2012, 37 pages.
Third Party Requester's Refiling of Certificate of Service for Requester Comments, for Reexamination Control No. 95/001,827, filed Jun. 21, 2012, 3 pages.
Third Party Requester's Opposition to Petition to Refuse Entry of Requester's Comments, for Reexamination Control No. 95/001,827, filed Jul. 12, 2012, 5 pages.
Decision Dismissing Petitions, for Reexamination Control No. 95/001,827, mailed Aug. 22, 2012, 5 pages.
Notice of Allowance for U.S. Appl. No. 12/787,779, mailed Dec. 20, 2010, 45 pages.
Notice of Allowance for U.S. Appl. No. 12/787,779, mailed Jan. 12, 2011, 48 pages.
Request for Reexamination of U.S. Patent No. 7,899,899, filed Jun. 27, 2011, 23 pages.
Notice of Reexamination Request Filing Date and Notice of Assignment of Reexamination Request, mailed Jul. 8, 2011, Reexamination Control No. 90/011,760, 2 pages.
Ex Parte Interview Summary for Reexamination Control No. 90/011,760, mailed Jul. 18, 2011, 3 pages.
Order Granting Request for Reexamination of U.S. Patent No. 7,899,899, mailed Aug. 19, 2011, Reexamination Control No. 90/011,760, 9 pages.
Office Action for Reexamination Control No. 90/011,760, mailed Nov. 18, 2011, 8 pages.
Decision on Petition for Extension of Time in Reexamination (Granted), mailed Jan. 5, 2012, Reexamination Control No. 90/011,760, 3 pages.
Final Office Action and Interview Summary for Reexamination Control No. 90/011,760, mailed Mar. 21, 2012, 14 pages.
Advisory Action for Reexamination Control No. 90/011,760, mailed Jul. 17, 2012, 11 pages.
Request for Inter Partes Reexamination for U.S. Patent No. 7,899,899 B1, filed Nov. 18, 2011, 153 pages.

(56) References Cited

OTHER PUBLICATIONS

Notice of Inter Partes Reexamination Request Filing Date and Notice of Assignment of Inter Partes Reexamination Request, mailed Nov. 29, 2011, Reexamination Control No. 95/001,826, 2 pages.
Order Granting Request for Inter Partes Reexamination of U.S. Patent No. 7,899,899 and Office Action for Reexamination Control No. 95/001,826, mailed Feb. 7, 2012, 19 pages.
Decision on Petition for Extension of Time in Reexamination (Granted), mailed Apr. 4, 2012, Reexamination Control No. 95/001,826, 3 pages.
Third Party Requester's Comments under 35 U.S.C. § 314(B)(2) and 37 C.F.R. § 1.947, for Reexamination Control No. 95/001,826, filed Jun. 6, 2012, 46 pages.
Third Party Requester's Refiling of Certificate of Service for Requester Comments, for Reexamination Control No. 95/001,826, filed Jun. 21, 2012, 3 pages.
Third Party Requester's Opposition to Petition to Refuse Entry of Requester's Comments, for Reexamination Control No. 95/001,826, filed Jul. 12, 2012, 5 pages.
Decision Dismissing Petitions, for Reexamination Control No. 95/001,826, mailed Aug. 22, 2012, 5 pages.
Non-Final Office Action for U.S. Appl. No. 13/023,292, mailed Jul. 8, 2011, 6 pages.
Notice of Allowance for U.S. Appl. No. 13/023,292, mailed Feb. 13, 2012, 85 pages.
Office Communication for U.S. Appl. No. 13/023,292, mailed Feb. 23, 2012, 11 pages.
Notice of Allowance for U.S. Appl. No. 13/023,292, mailed May 18, 2012, 25 pages.
Notice of Allowance for U.S. Appl. No. 13/023,292, mailed Jun. 4, 2012, 22 pages.
Office Communication for U.S. Appl. No. 13/023,292, mailed Jul. 2, 2012, 7 pages.
Office Communication for U.S. Appl. No. 13/023,292, mailed Aug. 24, 2012, 8 pages.
Non-Final Office Action for U.S. Appl. No. 13/595,952, mailed Nov. 13, 2012, 127 pages.
Non-Final Office Action for U.S. Appl. No. 10/924,552, Mailed Feb. 27, 2008, 30 pages.
Notice of Allowance for U.S. Appl. No. 10/924,552, Mailed May 30, 2008, 20 pages.
Non-Final Office Action for U.S. Appl. No. 12/177,021, mailed Jan. 29, 2010, 16 pages.
Final Office Action for U.S. Appl. No. 12/177,021, mailed Aug. 12, 2010, 20 pages.
Notice of Allowance for U.S. Appl. No. 12/177,021, mailed Dec. 10, 2010, 16 pages.
Non-Final Office Action for U.S. Appl. No. 13/008,321, mailed Nov. 20, 2012, 96 pages.
Non-Final Office Action for U.S. Appl. No. 12/916,390, mailed on Jul. 30, 2012, 50 pages.
Civil Action CV10-03428, Transcript of the Deposition of Kevin Delgadillo, taken Mar. 14, 2012, 12 pages.
Delgadillo, K., "Cisco DistributedDirector," posted Apr. 12, 1999, submitted as Exhibit 2 in Brocade Communications Systems, Inc. v. A10 Networks, Inc., Civil Action CV10-03428, Mar. 21, 2012, 27 pages.
Delgadillo, K., "Cisco DistributedDirector," 1999, submitted as Exhibit 3 in Brocade Communications Systems, Inc. v. A10 Networks, Inc., Civil Action CV10-03428, Mar. 21, 2012, 20 pages.
Declaration of James E. Mrose, entered as Exhibit Q in Brocade Communications Systems, Inc. v. A10 Networks, Inc., Civil Action CV10-03428, Mar. 21, 2012, 4 pages.
Information Disclosure Statement, filed Jul. 27, 1999 in the prosecution of U.S. Appl. No. 09/294,837, submitted as Exhibit A to the Mrose Declaration, 7 pages.
S. Ariyapperuma et al., "Security Vulnerabilities in DNS and DNS-SEC," Second International Conference on Availability, Reliability and Security (ARES '07), Apr. 2007, 8 pages.
Cisco Systems, Inc., "Configuring a DRP Server Agent," Jul. 6, 1999 (updated Oct. 11, 2006), 20 pages.
Hasenstein, Michael, "IP Address Translation", csn.tu-chemnitz.de/HyperNews/get/linux-ip-nat.html, 1997, 50 pages.
Hasenstein, Michael, "Linux IP Network Address Translation", web.archive.org/web/20031209024748/http://www.hasenstein.com/HyperNews/get/linux-tp-nat.html, Dec. 2003, 12 pages.
Venkataramani, Arun et al., "A mechanism for background transfers", Proceedings of the fifth symposium an operating systems design and implementation (OSDI'02), 2002, ISBN: 1-931971-06-4, Publisher: Usenix Assoc, Berkeley, CA, USA, Laboratory of Advanced Systems Research, Department of Computer Science, 19 pages.
Zhou, Tao, "Web Server Load Balancers", windowsitpro.com/print/networking/web-server-load-balancers, Feb. 29, 2000, 7 pages.
Bourke, Tony, "Server Load Balancing", Server Load Balancing, 2001, O'Reilly & Associates, Inc., Published by O'Reilly & Associates Inc., 101 Morris Street, Sebastopol CA 95472, Printed Aug. 2001, First Edition, 182 pages.

* cited by examiner

STATISTICAL TRACKING FOR GLOBAL SERVER LOAD BALANCING

CROSS REFERENCE TO RELATED APPLICATION

The present application is a continuation of U.S. patent application Ser. No. 10/211,822, entitled "STATISTICAL TRACKING OF GLOBAL SERVER LOAD BALANCING FOR SELECTING THE BEST NETWORK ADDRESS FROM ORDERED LIST OF NETWORK ADDRESSES BASED ON A SET OF PERFORMANCE METRICS," filed Aug. 1, 2002, issued on Aug. 1, 2006 as U.S. Pat. No. 7,086,061 assigned to the same assignee as the present application, and incorporated herein by reference in its entirety.

BACKGROUND OF THE INVENTION

1. Field of the Invention

The disclosure invention relates generally to load balancing among servers. More particularly but not exclusively, the present disclosure relates to tracking data associated with operation of load balancing systems that provide the address of a server expected to serve the client with a high performance in a given application.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS does not detect a server that is down. Consequently, the authoritative DNS server continues to return a disabled host server's IP address until an external agent updates the authoritative DNS server's resource records. Second, when providing its list of IP addresses, the authoritative DNS sever does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., that corresponding to a downed server) to persist in a local DNS server until the TTL for the invalid IP address expires.

One technique to address these shortcomings is a global server load balancing system provided by Foundry Networks, Inc. of Santa Clara, Calif. As one example, Foundry provides the ServerIron product to add intelligence to authoritative DNS servers by serving as a proxy to these servers. The ServerIron has a global server load balancing (GSLB) feature that intelligently uses health-checks and other methods to assess the availability and responsiveness of the host sites in the DNS reply. When necessary, the ServerIron exchanges the IP address at the top of the address list returned by the authoritative DNS with another IP address selected from the list, based on a set of performance metrics indicative of which particular host server may provide the optimum access. Thus, the GSLB feature ensures that a client always receives a DNS reply for a host site that is available and is the best choice among the available hosts. Example embodiments for global server load balancing are disclosed in currently pending U.S. application Ser. No. 09/670,487, entitled "GLOBAL SERVER LOAD BALANCING," filed Sep. 26, 2000, issued on Nov. 18, 2008 as U.S. Pat. No. 7,454,500, assigned to the same assignee as the present application, and which is incorporated herein by reference its entirety.

While this GSLB technique provides improvements in server load balancing, it would be beneficial to be able to provide GSLB operation-related data for purposes of deployment planning, trouble-shooting, maintenance, and the like, for instance.

BRIEF SUMMARY OF THE INVENTION

One aspect of the present invention provides a data-tracking method usable in a system configured for server load balancing. The method includes, in response to a query regarding a domain name, arranging network addresses into an ordered list based on a set of performance metrics related to access conditions to host servers corresponding to the domain name. The ordered list of network addresses is sent as a response to the query, and data related to the query is tracked.

DETAILED DESCRIPTION

Embodiments of statistical tracking associated with load balancing among servers are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides a method to track load-balancing operation-related data, such as data associated with a system configured for GSLB that orders IP addresses into a list based on a set of performance metrics. Such operation-related data can include, but not be limited to, inbound source IP addresses (e.g., the address of the originator of a DNS request), the requested host and zone, an identification and count of the selected "best" IP addresses, the selection metric used to decide on a particular best IP address, and a count of the number of times a particular metric was used as a deciding factor in selection of the best IP addresses.

As an example, one of the performance metrics may be a health check associated with querying, either periodically or on demand, host servers and relevant applications hosted on the host servers to determine the "health" (e.g., whether or not it is available). If, for illustrative purposes, the tracking data shows that out of 100 DNS queries, the health check metric was used as the deciding factor 95 times, then this situation may indicate that several servers may be "down," since it suggests that at least some of the servers are failing the health check. System maintenance personnel may then be dispatched to repair the downed servers, or to configure or install new servers that can assist in balancing the load.

In one embodiment, such load-balancing operation-related data can be provided and logged to a server, such as a system log (or "syslog") server. The tracking feature can be enabled/disabled as needed, such as disabling the feature when reporting or troubleshooting is not required.

Figure 1:
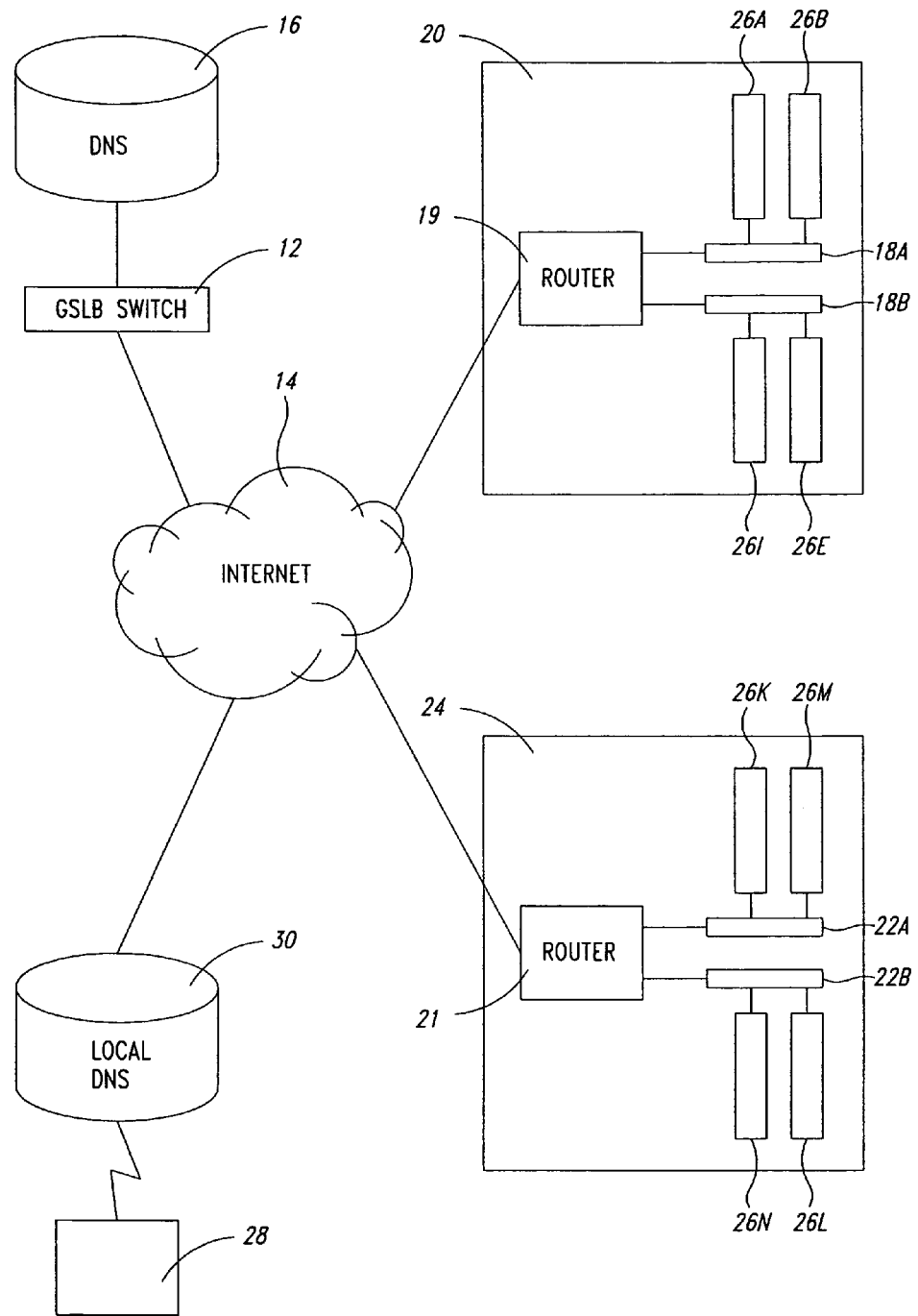
FIG. 1 illustrates a global server load-balancing configuration with which one embodiment of the invention may be implemented.

FIG. 1 illustrates one example global server load-balancing configuration with which an embodiment of the invention may be used. As shown in FIG. 1, GSLB switch 12 is connected to Internet 14 and acts as a proxy to an authoritative Domain Name System (DNS) server 16 for the domain "foundrynet.com" (for example). That is, while the actual DNS service is provided by DNS server 16, the IP address known to the rest of the Internet 14 for the authoritative DNS sever of the domain "foundrynet.com" is a virtual IP (VIP) address configured on GSLB switch 12. Of course, DNS server 16 can also act simultaneously as an authoritative DNS for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, ..., 26I, ... 26N. Some or all of servers 26A, ..., 26I, ..., 26N may host application server programs (e.g., http and ftp) relevant to the present invention. These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from Foundry Networks, Inc.

FIG. 1 also shows client program 28 connected to Internet 14, and communicates with local DNS server 30. When a browser on client 28 requests a web page, for example, using a Universal Resource Locator (URL), such as http://www.foundrynet.com/index.htm, a query is sent to local DNS server 30 to resolve the symbolic host name www.foundrynet.com to an IP address of a host server. The client program receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses is ordered by GSLB switch 12 based on performance metrics as described in further detail in U.S. application Ser. No. 09/670,487 (now U.S. Pat. No. 7,454,500 issued on Nov. 18, 2008) referenced above, and in U.S. application Ser. No. 10/206,580, entitled "GLOBAL SERVER LOAD BALANCING," filed Jul. 25, 2002, issued on Aug. 7, 2007 as U.S. Pat. No. 7,254,626, with inventors Sunanda Kommula et al., and assigned to the same assignee as the present application (and disclosing embodiments of a connection-load metric for GSLB). For the sake of brevity, these various performance metrics and the manner in which they are used in a GSLB algorithm to identify best sites in a list of IP addresses are summarized and not described in detail herein. Such additional details may be found in these co-pending applications.

In the remainder of this detailed description, for the purpose of illustrating embodiments of the present invention only, the list of IP addresses returned are assumed to be the virtual IP addresses configured on the proxy servers at switches 18A, 18B, 22A and 22B (sites 20 and 24). In one embodiment when the authoritative DNS server 16 resolves a host name in a query and returns one or more IP addresses, the GSLB switch 12 determines (using the performance metrics) which site switch would provide the best expected performance (e.g., response time) for client 28 and returns the IP address list with a virtual IP address configured at that site switch placed at the top. (Other forms of ranking or weighting the IP addresses in the list can also be possible.) Client program 28 can receive the ordered list of IP addresses, and typically selects the first IP address on the list to access the corresponding host server.

Figure 3:
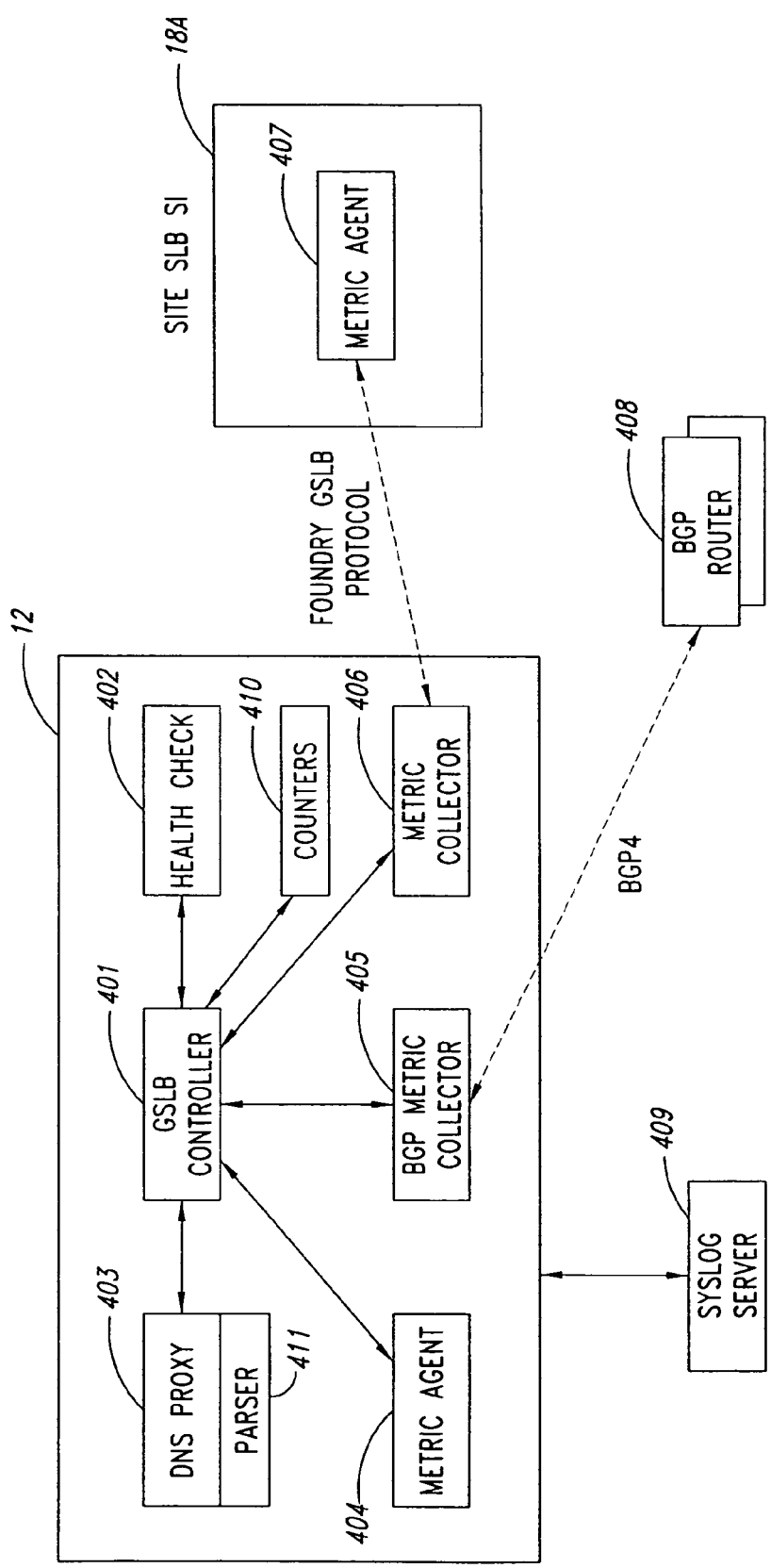
FIG. 3 is a block diagram showing the functional modules of a GSLB switch and a site switch relevant to tracking data associated with the global server load balancing operation in accordance with one embodiment of the invention.

FIG. 3 is a block diagram showing the functional modules of GSLB switch 12 and site switch 18A (for instance) relevant to the global server load balancing function in one embodiment. As shown in FIG. 3, GSLB switch 12 includes a GSLB switch controller 401, health check module 402, DNS proxy module 403, metric agent 404, routing metric collector 405, and site-specific metric collector 406. GSLB switch controller 401 provides general control functions for the operation of GSLB switch 12. Health check module 402 is responsible for querying, either periodically or on demand, host servers and relevant applications hosted on the host servers to determine the "health" (e.g., whether or not it is available) of each host server and each relevant application. Site-specific metric collector 406 communicates with metric agents in site-specific switches (e.g., FIG. 3 shows site-specific metric collector 406 communicating with site-specific metric agent 407 of a site server load balancing ServerIron or "SLB SI") to collect site-specific metrics (e.g., number of available sessions on a specific host server and/or connection-load data indicative of connections-per-second at that host server).

Routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (A) receives incoming DNS requests, (B) provides the host names to be resolved to DNS server 16, (C) receives from DNS server 16 a list of responsive IP addresses, (D) orders the IP addresses on the list received from DNS server 16 according to an embodiment of the present invention, using the metrics collected by routing-metric collector 405 and site specific collector 406, and values of any other relevant parameter, and (E) provides the ordered list of IP addresses to the requesting DNS server. Since GSLB switch 12 can also act as a site switch, GSLB switch 12 is provided site-specific metric agent 404 for collecting metrics for a site-specific metric collector.

One embodiment of the present invention provides a method to track inbound DNS requests. For example, the GSLB switch 12 is provided with capability to track data associated with the originator of the DNS request and with the decision process used to select the best IP address for that DNS request. Such tracking data can include the inbound source IP address of the originator of the DNS request, the requested host names and zone (e.g., for www.gslb.com, the host is "www" and the zone is "gslb.com"), the IP address that was selected as "best" in response to that DNS request, and the particular selection metric that was used to decide on that best IP address. It is appreciated that other types of data associated with the inbound DNS request and with the decision to select an IP address may be tracked by other embodiments of the invention, and that the types of data to be tracked are not restricted to those specifically identified herein.

In an embodiment of the invention, at least some of the data to be tracked can originate from the DNS proxy module 403 in cooperation with the switch controller 401 as needed. For example, since the DNS proxy module 403 receives incoming DNS requests and provides the host names to be resolved to the authoritative DNS server 16 and also receives the replies to the queries from the authoritative DNS server 16, the DNS proxy module 403 can include or otherwise use a parser 411 (or other software component) to identify and extract (from the DNS reply received from the authoritative DNS server 16 in one embodiment and/or from the original request in another embodiment) the source IP address and the requested zone and host.

To track the returned best IP address and the particular metric used to identify this IP address, one embodiment of the invention uses the switch controller 401 to track this information while performing and completing the GSLB algorithm. Alternatively or in addition, the DNS proxy module 403 (via use of the parser 411) may be used to identify and extract the best IP address from the list of responsive IP addresses after completion of the GSLB algorithm.

In an embodiment, one or more servers external to the GSLB switch 12 can be used to receive and log (for storage and subsequent access) the data tracked in the manner described above. An example of such a server is a system log ("syslog") server 409 shown in FIG. 3 that includes a machine-readable storage medium to store the tracked data. The syslog server 409 can be communicatively coupled to the GSLB switch 12 by way of the DNS proxy module 403 or via other communication interface suitable to transfer the tracked data from the GSLB switch 12 to the syslog server 409.

Alternatively or in addition, the data-logging capabilities provided by the syslog server 409 can be configured in the GSLB switch 12 itself, such as a machine-readable storage medium of the GSLB switch 12 that is configured to receive and log the tracked data and to provide accessibility to the logged data for troubleshooting and maintenance purposes. Still alternatively or in addition, syslog servers 409 may be located at the sites 20 and 24, and can be configured to transfer their logged data to other syslog servers 409, if needed, for further processing, storage, and access.

The tracking at the syslog server 409 and/or at the GSLB switch 12 can be enabled or disabled via one or more user (e.g., a system administrator) commands. For instance, a command line interface (CLI) command can be used to enable/disable the logging of all the data, or selective ones of the data in one other embodiment. The CLI command can be entered via any suitable user interface in the GSLB system, and by default in an embodiment, the logging is disabled until later specifically enabled by a CLI command.

A sample output of the syslog server 409, which may be used for troubleshooting, maintenance, or deployment planning purposes is (for a client with a source IP address of 1.1.1.21 sending a DNS query for www.gslb.com):
20:52:02 User.Info 1.1.1.102 GSLB DNS request: src-ip=001.001.001.021 best-ip=001.001.001.101 Host=www Zone=gslb.com Metric=health-check As shown above, this sample output indicates the source IP address, the zone and host, the IP address (1.1.1.101) selected as best, and an identification of which metric (health check) was used to select the best IP address.

Another embodiment of the invention provides counters at the metric-level granularity to count the number of times a particular metric was used as the deciding factor over other metrics in identifying the best IP address. As an additional feature, other counters can be provided that track the number of times each IP address (e.g., VIP address) was selected as the "best" IP address.

FIG. 3 shows one embodiment of the GSLB switch 12 that includes a plurality of counters 410 to count the number of times each particular metric was used to identify the best IP address. While the embodiment of FIG. 3 shows the counters 410 as being separate components, it is appreciated that counting capability can be configured in the metric collectors 405 and 406 or in other components of the GSLB switch 12, or combination of components thereof. According to an embodiment, a separate counter 410 is provided for each VIP, thereby providing a count of how many times that VIP was chosen as the best IP address based on a particular metric. Thus, if VIP-1 was selected 100 times, its metric counter would show that of those 100 times, VIP-1 was selected 20 times based on round trip time (RU), 40 times based on capacity, 40 times based on round-robin, for example.

In an embodiment, additional counter(s) can be provided to count the number of times (e.g., 100 times in the preceding example) that each VIP is selected. These additional counters can be configured similarly as the counters 410 within the GSLB switch 12, except that they are counting a different type of occurrence.

Again, the count data can be accessed and viewed by a system administrator for purposes of maintenance, troubleshooting, or pre-deployment planning. For instance, if the count data for a particular VIP shows a very high count for the connection-load metric, then this data suggests that the VIP has won over the other choices because the others failed to pass the connection-load limit threshold. This indicates that the other VIPs are facing a very high load of connections-per-second, which signals the system administrator to take proper measures, if that is not intended. Such measures can include, for example, diverting some of the connections to less-busy servers or installing additional servers to handle the heavy load.

As another example, if a system administrator suspects that something is wrong with addresses being provided to Australian clients, the administrator can enable the tracking mechanism to log client requests and DNS replies. In the log data, if an Australian client is given a United States address based on RTT, this may indicate that the more-closer Australian server(s) are down or busy, and therefore need troubleshooting service so that the Australian clients can be provided with the IP addresses for the Australian servers.

With regards to the metrics that are applicable to the tracking operations described above, the metrics used in a GSLB switch 12 in one embodiment include (a) the health of each host server and selected applications, (b) each site switch's session capacity threshold, (c) the round trip time (RTT) between a site switch and a client in a previous access, (d) the geographical location of a host server, (e) the connection-load measure of new connections-per-second at a site switch, (f) the current available session capacity in each site switch, (g) the "flashback" speed between each site switch and the GSLB switch (i.e., how quickly each site switch responds to a health check from the GSLB switch), and (h) a policy called the "Least Response Selection" (LRS) which prefers the site least selected previously. Many of these performance metrics can be provided default values. Each individual metric can be used in any order, such as an order of (a) through (h) identified above, and each metric can be disabled if desired. In one embodiment, the LRS metric is always enabled.

To briefly describe herein one embodiment of a GSLB algorithm (embodiments of which are described in further detail in the co-pending applications previously identified), assume for purposes of illustration that the metric order is (a) through (h) as identified above. Upon receiving the IP address list from the authoritative DNS server 16, GSLB switch 12 performs, for each IP address on the IP address list (e.g., host server 261 connected to site switch 18B), a layer 4 health check and a layer 7 check. Such a health check can be achieved, for example, by a "ping-like" operation defined under the relevant protocol, such as sending SYN/ACK packets under the TCP protocol. If a host server or an associated application fails any of the health checks it is disqualified from being the "best" site and may be excluded from the IP address list to be returned to client program 28.

If the resulting list of IP addresses has only one IP address, then the list of IP addresses is returned to client program 28. Otherwise if there are multiple IP addresses remaining, the IP address list is assessed under the next metric in the algorithm, which is the "capacity threshold" of the site switch serving that IP address. The virtual IP address configured at site switch 18B, for example, may be disqualified from being the "best" IP address if the number of sessions for switch 18B exceed a predetermined threshold percentage (e.g., 90%) of the maximum number of sessions that the site switch can serve. If the resulting list of IP addresses has only one IP address, then list of IP addresses is returned to client program 28.

If, however, the IP address list has multiple IP addresses, the remaining IP addresses on the list can then be reordered based upon a round-trip time (RTT) between the site switch for the IP address (e.g., site switch 18B) and the client (e.g., client 28). The RTT is computed (and stored), for instance, for the interval between the time when a client machine requests a TCP connection to a proxy server configured on a site switch, sending the proxy server a TCP SYN packet, and the time a site switch receives from the client program a TCP ACK packet. Again, if the top entries on the list of IP addresses do not have equal RTTs, the list of IP addresses is returned to client program 28.

If multiple sites have equal RTTs, then the list is reordered based upon the next metric in the GSLB algorithm, which is based on the location (geography) of the host server. The GSLB switch prefers an IP address that is in the same geographical region as the client machine in an embodiment. If the top two entries on the IP list are not equally ranked, the IP list is sent to the client program 28.

After using the geographic metric, if multiple sites are of equal rank for the best site, the IP addresses can then be reordered based upon site connection load. The connection-load metric feature allows comparison of sites based on the connection-load on their respective agent (e.g., at the metric agent 407 of the site ServerIron switch 18A in FIG. 3, for instance). The connection-load is a measure of new connections-per-second on the agent 407 in one embodiment. If a calculated average load is less than a specified load limit, the site is passed on to the next stage of the GSLB algorithm—otherwise that site is eliminated/rejected from the set of potential candidates.

If there are no multiple candidates at the top of the IP list that have passed the connection-load metric (or there are none of equal rank), then the IP address list is sent to the client program 28. If multiple sites are of equal rank for the best site, the IP addresses can then be reordered based upon available session capacity, which is the next metric in the GSLB algorithm. For example in one embodiment, if switch 18A has 1,000,000 sessions available and switch 22B has 800,000 sessions available, switch 18A is then preferred, if a tolerance limit, representing the difference in sessions available expressed as a percentage of capacity in the larger switch, is exceeded. If an IP address is preferred, the IP address will be placed at the top of the IP address list, and is then returned to the requesting entity. Otherwise, if the session capacity does not resolve the best IP address, then resolution is based upon a "flashback" speed. The flashback speed is a time required for a site switch to respond to layers 4 and 7 health checks by the GSLB switch in one embodiment. The preferred IP address will correspond to a flashback speed exceeding the next one by a preset tolerance limit.

If a best IP address is resolved, the IP address list is sent to client program 28. Otherwise, an IP address in the site that is least often selected to be the "best" site (e.g., the LRS metric) is chosen. The IP address list is then sent to client program 28. Upon receipt of the IP address list, the client program 28 uses the best IP address selected (i.e., the top of the list) to establish a TCP connection with a host server.

Figure 2:
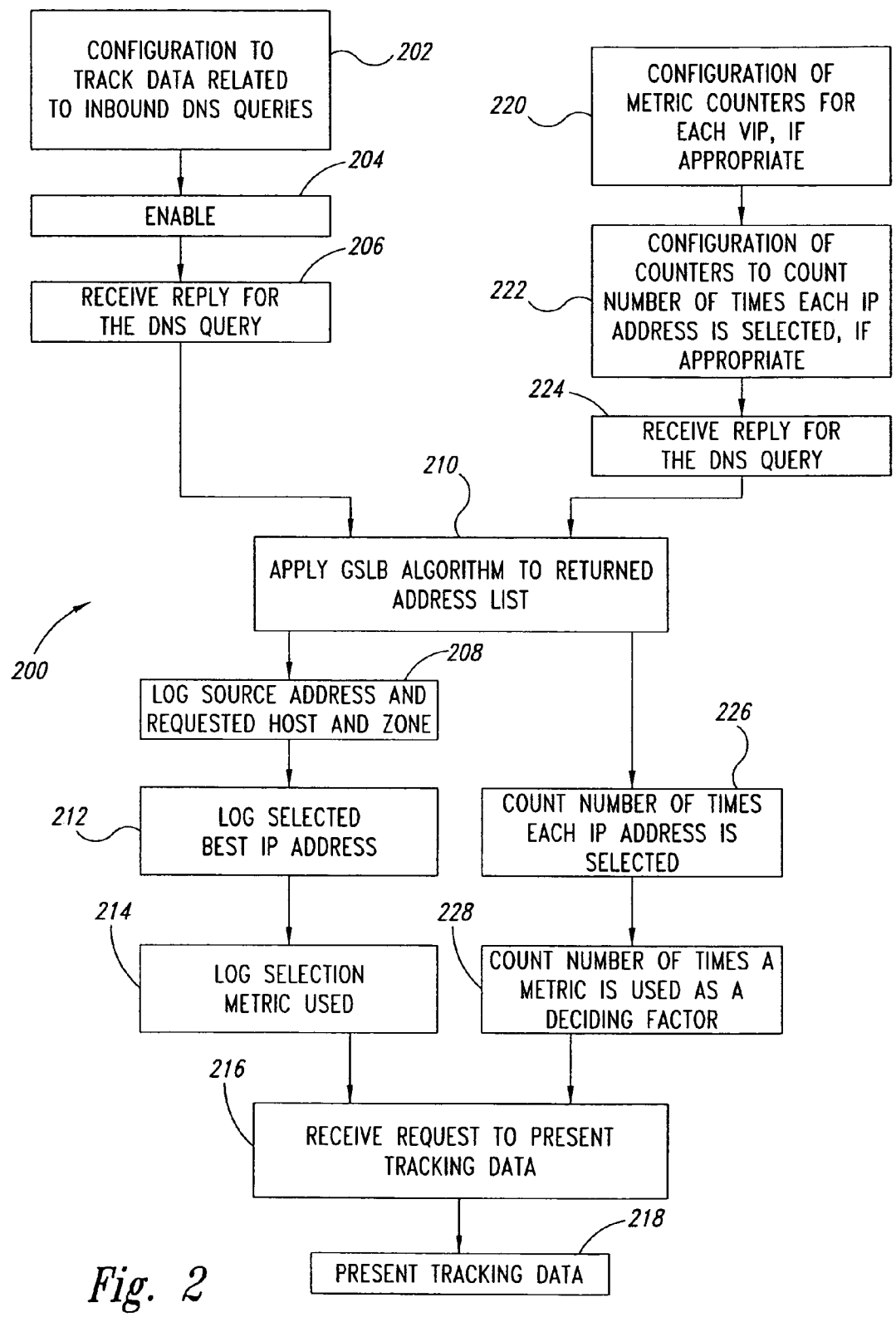
FIG. 2 illustrates in a flow chart one embodiment of a method for tracking data related to global server load balancing.

FIG. 2 illustrates in a flow chart 200 one embodiment of a method for tracking data related to global server load balancing. At least some of the elements of the flowchart 200 may be embodied in software or other machine-readable instructions stored on one or more machine-readable media. Such machine-readable media may be at the GSLB switch 12, at the syslog server 409, at sites 20 or 24, or at other locations or combinations thereof. The flowchart 200 shows two separate concurrent paths, one path for logging data related to inbound DNS queries and another path for counting metric data. It is appreciated that this depiction is for purposes of explanation and clarification, and that in some embodiments, there not need be two separate paths for these operations (e.g., they can be performed sequentially or concurrently within the "same path"). Moreover, the various operations need not necessarily occur in the exact order depicted and that some operations can be eliminated or combined.

Beginning first at a block 202, the GSLB switch 12 and the syslog server 409 are configured to track data related to inbound DNS queries, such as data identifying a source address and requested host and zone, which may be obtained from the reply to the query provided by the authoritative DNS server 16 in one embodiment. Such configuration can include, for instance, adding CLI enabling/disabling feature, identifying which (if not all) data to track, and setting parameters for the data to be tracked (e.g., setting the tracking to occur only during specific hours of certain days, for instance). As another example, it may be desired in some implementations to track the requested hosts and zones, but not necessarily the address of the source of the DNS request.

Once configuration is completed at the block 202, the tracking can be enabled at a block 204. This enablement may be performed by a system administrator via a CLI command in one embodiment described above. Thereafter, tracking data related to received replies to DNS queries at a block 206 can begin.

The DNS reply (to the original query) is received at the block 206 from the authoritative DNS server 16. When an IP address list is returned to the GSLB switch 12 from the authoritative DNS server 16 in the reply, the GSLB algorithm described above is applied to the address list at a block 210. An ordered list of IP addresses results, with the best IP address listed at the top.

The address of the requesting source and the requested host and zone are logged at the block 208 from the reply received from the authoritative DNS server 16. As previously described above, this operation can involve a parsing of the DNS reply by the DNS proxy module 403 in cooperation with the parser 411, followed by logging of the parsed information into the syslog server 409. The parsing of the DNS reply can be performed to find the client's subnet address, in one embodiment, since the reply is destined to the client's local DNS server 30.

Based on this ordered list of IP addresses, the selected best IP address is logged at a block 212. This operation at the block 212 may involve, for instance, parsing the best IP address from the top of the list and sending that IP address to the syslog server 409 for storage as part of the log data to be compiled into statistics. Additionally at a block 214, the particular metric used to select that IP address is logged.

When appropriate, a system administrator or other entity (including automated monitoring agents) sends a request for the tracking data at a block 216. This may be performed, for instance, by accessing the syslog server 409 to request the data stored therein. At a block 218, the requested tracking data is presented, such as via hardcopy computer printout or on a user interface screen.

With regards to the other path of the flowchart 200 related to counting metrics, configuration of the metric counters 410 occurs at a block 220 in implementations where per-metric counting capability can be enabled or disabled through a CLI. In other embodiments, this configuration is not performed. This configuration can involve, for example and in implementations where it is appropriate, assigning counters for each VIP address, correlating the counters to each metric, and so forth. Another possible configuration can involve enabling the counters for only a subset of all performance metrics for a particular VIP address and/or for every VIP address. Additional configuration, if appropriate, may be performed at a block 222 to provide for a count of the number of times each VIP is selected as the best address.

In a response to DNS queries at a block 224 (or at the block 206), lists of IP addresses are returned from the authoritative DNS server 16, and the GSLB algorithm is applied to the address lists at the block 210. At a block 226, the number of times each IP address (or VIP address) is selected is counted. At a block 228, the counters 410 count the number of times a metric is used as a deciding factor over other metrics, for each IP address (or VIP address). It is appreciated that operations related to the counting can be performed, including providing percentages in addition or alternatively to hard counts. The count data may then be requested and presented at blocks 216 and 218, respectively.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computerized method performed by a module on a network device, the method comprising:
    arranging, by the network device network addresses into an ordered list based on a set of different types of performance metrics in response to a request for a network address by a query;
    respectively incrementing, by the network device a first plurality of counters to count a number of times that each different type of performance metric of the set is used to determine a best network address among the ordered list of network addresses for selection in response to the query, wherein each counter of the first plurality of counters is associated with a different performance metric of the set of different types of performance metrics; and
    comparing the counts associated with each different type of performance metric, the comparison indicating a status of a subset of the network addresses.

2. The computerized method of claim 1, further comprising determining the best network address from a plurality of the network addresses contained in a domain name system (DNS) response in reply to a DNS query.

3. The computerized method of claim 2, further comprising for a plurality of additional queries, respectively incrementing, by the network device, a second plurality of counters to count a number of times that each address among the ordered list of network addresses is selected as a best network address, wherein each counter of the second plurality of counters is associated with one of the network addresses.

4. The computerized method of claim 2, further comprising:
    recording, from the DNS response in reply to the DNS query, an address of a source of the DNS query; and
    recording, from the DNS response in reply to the DNS query, a requested host and zone.

5. The computerized method of claim 1, wherein arranging network addresses into an ordered list comprises: arranging virtual network addresses, respectively located at site switches that communicate with the network device, into the ordered list.

6. The computerized method of claim 1, wherein the network device is arranged as a proxy to an authoritative DNS server to receive the DNS response from the authoritative DNS server.

7. The computerized method of claim 1, further comprising receiving instructions to enable or disable, for each different type of performance metric, the count of the number of times that each different type of performance metric of the set is used to determine the best network address.

8. An article of manufacture, comprising:
   a non-transitory machine-readable medium comprising machine-readable instructions stored thereon to when executed performs the steps of:
   arranging virtual network addresses, each associated with at least one host server, into an ordered list based on a set of different types of performance metrics in response to a request for a virtual network address by a query;
   incrementing a first plurality of counters to count a number of times that each different type of performance metric of the set is used to determine a best virtual network address among the ordered list of virtual network addresses for selection in response to the query, wherein each counter of the first plurality of counters is associated with a different performance metric of the set of different types of performance metrics: and
   comparing the counts associated with each different type of performance metric, the comparison indicating a status of a subset of the virtual network addresses.

9. The article of manufacture of claim 8, wherein the best virtual network address is selected in response to a query.

10. The article of manufacture of claim 9, wherein the non-transitory machine-readable medium further comprises machine-readable instructions stored thereon to:
   increment a second plurality of counters, for a plurality of additional queries, to count a number of times that each virtual network address among the ordered list of virtual network addresses is selected as a best virtual network address, wherein each counter of the second plurality of counters is associated with one of the virtual network addresses.

11. The article of manufacture of claim 9, wherein the non-transitory machine-readable medium further comprises machine-readable instructions stored thereon to:
   obtain, from a reply to the query, a source address of the query.

12. The article of manufacture of claim 9, wherein the non-transitory machine-readable medium further comprises machine-readable instructions stored thereon to:
   obtain, from a reply to the query, a requested host and zone.

13. The article of manufacture of claim 8, wherein the non-transitory machine-readable medium further comprises machine-readable instructions stored thereon to:
   selectively enable or disable, for each different type of performance metric, the count of number of times that each different type of performance metric of the set is decisive in selection of one of the virtual network addresses as the best network address.

14. The article of manufacture of claim 8, wherein the non-transitory machine-readable medium further comprises machine-readable instructions stored thereon to:
   communicate, to an external device, the counts of the number of times that each different type of performance metric of the set is decisive in selection of one of the virtual network addresses as the best network address.

15. A network connected device comprising:
   a module to arrange network addresses into an ordered list based on a set of different types of performance metrics in response to a request for a network address by a query;
   a plurality of metric counters to count a number of times that each different type of performance metric in the set of different types of performance metrics is used as a deciding factor in selection of a best network address among the ordered list of network addresses in response to the query, wherein each metric counter of the plurality of metric counters is associated with a different performance metric of the set of different types of performance metrics;
   comparing the counts associated with each different type of performance metric, the comparison indicating a status of a subset of the plurality of network addresses; and
   a non-transitory storage medium to store an identification of the best network address and an identification of which metric was used to select the best network address.

16. The network connected device of claim 15, wherein the network connected device is arranged as a proxy to an authoritative domain name system (DNS) server to receive a DNS response, comprising a list of addresses from which the best address is selected, from the authoritative DNS server.

17. The network connected device of claim 16, wherein the ordered list includes the best network address at the top of the list.

18. The network connected device of claim 15, wherein the network connected device further comprises a second plurality of counters to count a number of times that each network address of the plurality of network addresses is selected as the best network address, wherein each counter of the second plurality of counters is associated with one of the network addresses.

19. The network connected device of claim 15, wherein each of the plurality of metric counters, can be selectively enabled or disabled.

20. The network connected device of claim 15, wherein the network connected device is arranged to provide, to a syslog server, a count of the number of times that each different type of metric in the set of different types of performance metrics is used as the deciding factor.

\* \* \* \* \*